United States Patent
Anifowose et al.

(10) Patent No.: US 12,461,085 B2
(45) Date of Patent: Nov. 4, 2025

(54) AUTOMATED SOURCE ROCK NET THICKNESS PREDICTION SYSTEM AND METHOD

(71) Applicant: SAUDI ARABIAN OIL COMPANY, Dhahran (SA)

(72) Inventors: Fatai A. Anifowose, Al-Khobar (SA); Maimona Washie, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 553 days.

(21) Appl. No.: 17/819,562

(22) Filed: Aug. 12, 2022

(65) Prior Publication Data

US 2024/0053319 A1    Feb. 15, 2024

(51) Int. Cl.
    *G01N 33/24*      (2006.01)
    *E21B 25/00*      (2006.01)
    (Continued)

(52) U.S. Cl.
    CPC ............ *G01N 33/24* (2013.01); *E21B 44/00* (2013.01); *E21B 49/02* (2013.01); *G01N 23/223* (2013.01);
    (Continued)

(58) Field of Classification Search
    CPC ...... G01N 33/24; G01N 23/223; G01N 25/00; G01N 25/20; G01N 2223/076;
    (Continued)

(56) References Cited

U.S. PATENT DOCUMENTS

| | | | |
|---|---|---|---|
| 7,013,972 B2 | 3/2006 | Vinegar et al. | |
| 7,100,994 B2 | 9/2006 | Vinegar et al. | |

(Continued)

FOREIGN PATENT DOCUMENTS

| | | |
|---|---|---|
| CN | 103792592 A | 5/2014 |
| CN | 108717211 A | 10/2018 |

(Continued)

OTHER PUBLICATIONS

Nader et al. (Geochemical characterization of the source rock intervals, Beni-Suef Basin, West Nile Valley, Egypt) herein after "Nader", Open Geosciences 2021:13:1536-1551 (Year: 2021).*

(Continued)

*Primary Examiner* — Catherine T. Rastovski
*Assistant Examiner* — Sharad Timilsina
(74) *Attorney, Agent, or Firm* — Osha Bergman Watanabe & Burton LLP

(57) ABSTRACT

A system and method for determining a net source rock thickness is disclosed. The method includes obtaining at least one well log, a first and second plurality of core samples from a wellbore, and for each of the first plurality determining a relative abundance of inorganic materials, and for each of the second plurality a set of organic material data. The method further includes determining a validated total organic content and a measured source rock thickness based on the organic material data and relative abundance of inorganic materials and determining a data and a prediction portion of the wellbore, based on the second plurality sample locations. The method still further includes determining a cut-off value for each well log, predicting a source rock thickness from the cut-off values and the net source rock thickness from a sum of the predicted and the measured source rock thicknesses.

14 Claims, 13 Drawing Sheets

(51) Int. Cl.
*E21B 44/00* (2006.01)
*E21B 49/00* (2006.01)
*E21B 49/02* (2006.01)
*E21B 49/06* (2006.01)
*G01N 23/223* (2006.01)
*G01N 25/00* (2006.01)
*G01N 25/20* (2006.01)
*G01V 11/00* (2006.01)
*H01J 49/10* (2006.01)

(52) U.S. Cl.
CPC .............. *G01N 25/00* (2013.01); *G01N 25/20* (2013.01); *G01V 11/00* (2013.01); *H01J 49/105* (2013.01); *E21B 25/00* (2013.01); *E21B 49/00* (2013.01); *E21B 49/06* (2013.01); *G01N 2223/076* (2013.01); *G01N 2223/616* (2013.01)

(58) Field of Classification Search
CPC ... G01N 2223/616; E21B 44/00; E21B 49/02; E21B 25/00; E21B 49/00; E21B 49/06; G01V 11/00; H01J 49/105
See application file for complete search history.

(56) References Cited

U.S. PATENT DOCUMENTS

| | | | |
|---|---|---|---|
| 7,486,589 | B2 | 2/2009 | Lee et al. |
| 8,492,153 | B2 | 7/2013 | Jones et al. |
| 8,729,903 | B2 | 5/2014 | Srnka et al. |
| 10,408,962 | B2 | 9/2019 | Song |
| 2013/0262069 | A1* | 10/2013 | Leonard .................. E21B 43/00 703/10 |
| 2018/0034735 | A1 | 2/2018 | Zaifman et al. |
| 2018/0347354 | A1* | 12/2018 | Li .......................... G06N 20/00 |
| 2020/0018740 | A1* | 1/2020 | Hou ....................... G06Q 10/04 |
| 2020/0408090 | A1* | 12/2020 | Kadayam Viswanathan ............... G01N 24/08 |
| 2021/0255358 | A1 | 8/2021 | Fawad et al. |
| 2022/0042413 | A1 | 2/2022 | Wang et al. |

FOREIGN PATENT DOCUMENTS

| | | |
|---|---|---|
| CN | 111949945 A | 11/2020 |
| CN | 113123780 A | 7/2021 |
| CN | 113589398 A | 11/2021 |

OTHER PUBLICATIONS

N. A. A. Edress et al.; "Geochemical characterization of the source rock intervals, Beni-Suef Basin, West Nile Valley, Egypt", Open Geosciences; vol. 13; Issue 1; Dec. 22, 2021; pp. 1536-1551 (16 pages).

Le Thi Nhut Suong et al.; "Application of Machine Learning Algorithms in Predicting Pyrolytic Analysis Result", IOP Conference Series: Earth and Environmental Science; vol. 931; 2021 (11 pages).

S. Jiang et al.; "Improving the Total Organic Carbon Estimation of the Eagle Ford Shale with Density Logs by Considering the Effect of Pyrite", Minerals; vol. 8; No. 154; Apr. 2018; pp. 1-12 (12 pages).

G. Scheeder et al.; "Geochemical implications from direct Rock-Eval pyrolysis of petroleum", Organic Geochemistry; vol. 146; May 26, 2020; pp. 1-11 (11 pages).

K. E. Peters; "Guidelines for Evaluating Petroleum Source Rock Using Programmed Pyrolysis", The American Association of Petroleum Geologists Bulletin; vol. 70; No. 3; Mar. 1986; pp. 318-329 (12 pages).

N. M. Al-Areeq; "Petroleum Source Rocks Characterization and Hydrocarbon Generation", in: Recent Insights in Petroleum Science and Engineering; IntechOpen; Ch. 1; Feb. 7, 2018; pp. 3-30 (28 pages).

Office Action issued by the Saudi Arabian Patent Office for corresponding Saudi Patent Application No. 123450151, mailed Mar. 2, 2025 (12 pages).

\* cited by examiner

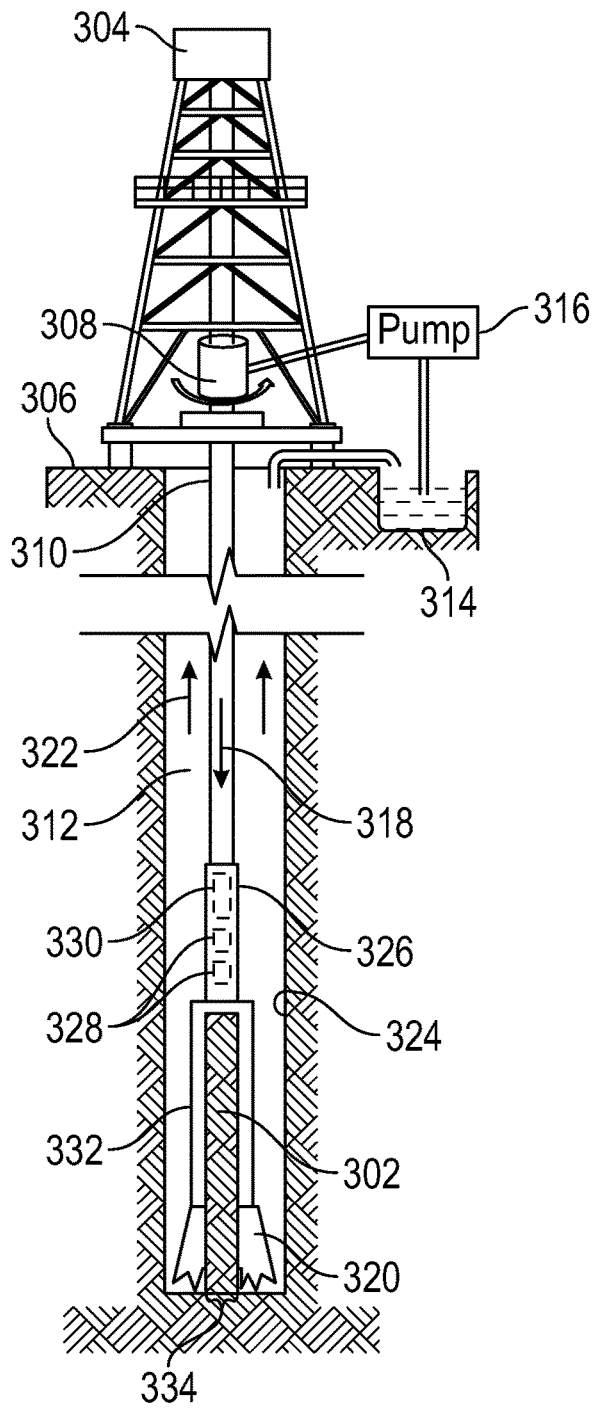
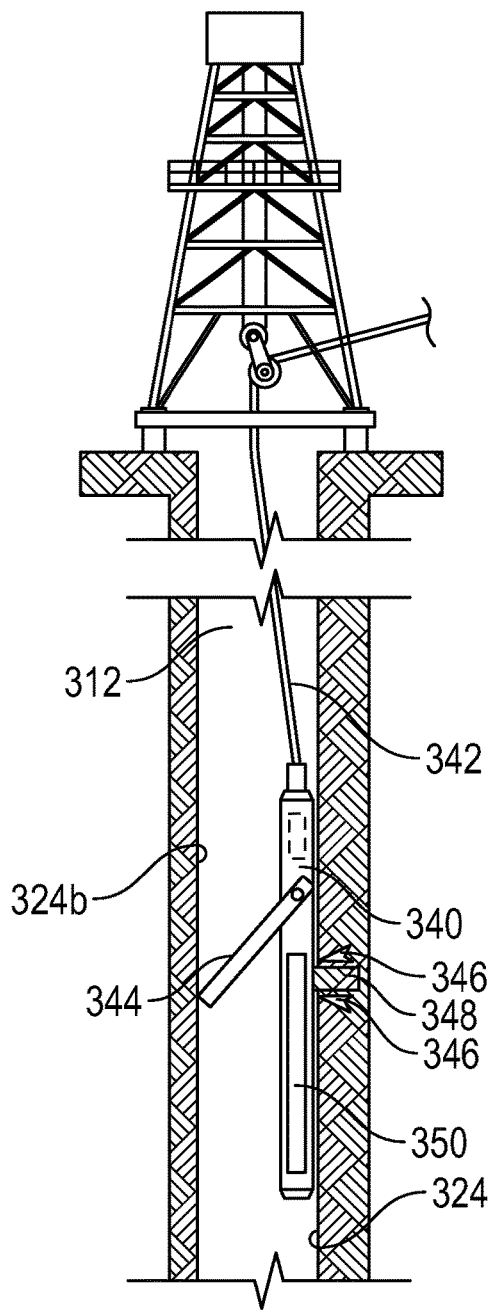
FIG. 3A
FIG. 3B

AUTOMATED SOURCE ROCK NET THICKNESS PREDICTION SYSTEM AND METHOD

BACKGROUND

Petroleum systems modeling provides a framework for integrating many types of data essential for hydrocarbon resource assessment. These data types include petroleum system elements such as hydrocarbon reservoir, seal, and source rock intervals; the timing of depositional, hiatus, and erosional events and their influences on petroleum systems; the incorporation of vertical and lateral distribution and lithologies of strata that compose the petroleum systems; and calculations of pressure-volume-temperature (PVT) histories. Petroleum systems modeling provides a means to test and refine understanding of oil and gas generation, migration, and accumulation. Typically, results of modeling are presented visually, numerically, and statistically, which enhances interpretation of the processes that affect the petroleum system through time, including areas of petroleum generation, migration pathways, accumulations, and relative contributions of source rocks to the hydrocarbon components.

One-dimensional (1-D), two-dimensional (2-D), and three-dimensional (3-D) petroleum system models may be developed for various purposes. 1-D models are limited to study point locations, mainly well locations. Maps and cross-sections model geologic information in two dimensions and can incorporate direct input of 2-D seismic and other data. Such models are typically built early in the geologic assessment of a geological basin or hydrocarbon field. The primary limitation of these models is that they only represent generation, migration, and accumulation in two dimensions. 3-D models are generally built at hydrocarbon reservoir to basin scales. They provide a much more detailed and realistic representation of petroleum systems than 1-D or 2-D models because they portray more fully the temporal and physical relations among sediment deposition, burial history; lithology and associated changes in porosity, permeability, and compaction; hydrodynamic effects; and hydrocarbon generation from source rocks, migration, and accumulation in hydrocarbon reservoirs. Upon completion of a 3-D model, geoscientists and engineers may apply the results to evaluating the timing of oil and/or gas generation, migration, and accumulation relative to timing of hydrocarbon trap formation. Thus, petroleum system modeling may allow a more accurate and less uncertain estimate of the size of hydrocarbon resources and the prediction of potential drilling hazard, such as shallow gas pockets and overpressure zones.

Modeling a conventional petroleum system requires information on four fundamental components: source rock, hydrocarbon reservoir rock, trap and seal and two key processes: petroleum generation from source rocks and petroleum migration from the source rock to the hydrocarbon reservoir. In contrast, unconventional petroleum systems require, at a minimum, information on the total organic content (TOC) of the source rock and the net thickness of the source rock. Exiting methods of determining TOC and the net thickness require the expensive retrieval and analysis of rock core samples. Accordingly, there exists a need for a fast, automated method for determining TOC and net source rock thickness with a minimal use of core samples.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for determining a net source rock thickness for a subterranean region of interest. The method includes obtaining at least one well log from at least one a segment of a wellbore penetrating the subterranean region of interest, obtaining a first plurality of core samples from the segment, and obtaining a second plurality of core samples from the segment. For each of the first plurality of core samples, the method includes determining a relative abundance of each of a set of inorganic materials, and for each of the second plurality of core samples determining a set of organic material data, using pyrolysis, where the set of organic material data comprises a first yield (S1), a second yield (S2), a third yield (S3), and a temperature (Tmax). For each of the second plurality of core samples the method further includes determining a cross-checked total organic content (xc-TOC) based, at least in part, on the organic material data, and determining a validated total organic content (vTOC) and a measured source rock thickness based, at least in part, on the xc-TOC and the relative abundance of each of the set of inorganic materials. The method still further includes determining a data portion and a prediction portion of the segment, based on sample locations of the second plurality of core samples, determining at least one cut-off value for each of the at least one well log based, at least in part, on the vTOC, and predicting a predicted source rock thickness within the prediction portion of the segment based on the at least one cut-off values. The method also includes determining the net source rock thickness from a sum of the predicted source rock thickness and the measured source rock thickness within the data portion.

In general, in one aspect, embodiments relate to a system including a well logging system, a well coring system, an inductively coupled plasma-mass spectrometry and an X-ray fluorescence system, a pyrolysis system, and a computer processor. The well logging is configured to obtain at least one well log from at least one a segment of a wellbore penetrating a subterranean region of interest. The well coring system is configured to obtain a first plurality and a second plurality of core samples from the segment. The inductively coupled plasma-mass spectrometry and an X-ray fluorescence system are configured to determine, for each of the first plurality of core samples, inorganic material data and a relative abundance for a set of inorganic materials. The pyrolysis system is configured to determine, for each of the second plurality of core samples, organic material data. The organic material data may include a first yield (S1), a second yield (S2), a third yield (S3), and a temperature (Tmax). The computer processor, configured to determine a cross-checked total organic content (xc-TOC) based, at least in part, on the first set of organic material data and determine a validated total organic content (vTOC) and a measured source rock thickness based, at least in part, on the xc-TOC and the relative abundance of each of the set of inorganic materials. The computer processor is further configured to determine a data portion and a prediction portion of the segment, based on sample locations of the second plurality of core samples, and to determine at least one cut-off value for each of the at least one well logs based, at least in part, on the vTOC. The computer processor is still further configured to predict a predicted source rock thickness within the prediction portion of the segment based on the at least one cut-off value, and determine a net source rock thickness from a sum of the predicted source rock thickness and the measured source rock thickness.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, unless explicitly specified, the particular shapes of the elements as drawn are not necessarily intended to convey any information regarding the actual shape of the particular elements and have been solely selected for ease of recognition in the drawing.

FIGS. 3A and 3B depict systems in accordance with one or more embodiments.

DETAILED DESCRIPTION

Figure 1:
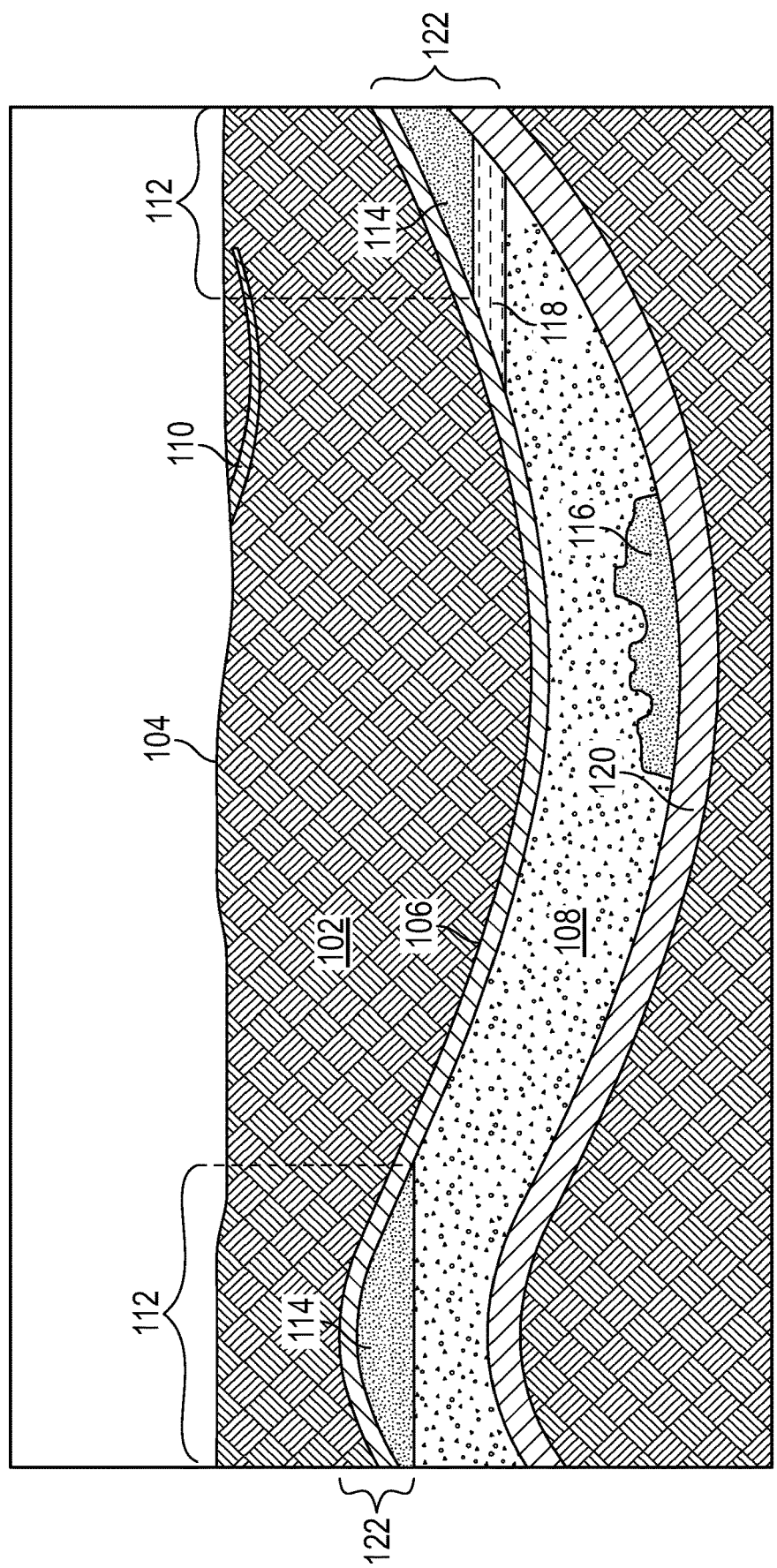
FIG. 1 depicts a subterranean region of interest in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "well log" includes reference to one or more of such well logs.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the method may be omitted, repeated, and/or performed in a different order than the order shown. Accordingly, the scope disclosed herein should not be considered limited to the specific arrangement of steps shown in the method.

Although multiple dependent claims are not introduced, it would be apparent to one of ordinary skill that the subject matter of the dependent claims of one or more embodiments may be combined with other dependent claims.

In the following description of FIGS. 1-12, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Predicting the characteristics of hydrocarbon field, such as the total amount of hydrocarbon, the relative amounts of oil, dry and wet gas, and its economic viability, require an understanding of multiple constituent components of the hydrocarbon field's structure and its history over geological time. For example, the thickness and porosity of the hydrocarbon reservoir and the topography of overlying sealing rock may control the volume available to store hydrocarbon. Similarly, the burial history of the kerogen-rich source rock and the local temperature variation with depth may control the relative amounts of oil and gas produced over time from the source rock.

FIG. 1 depicts a schematic cross-section (100) of a hydrocarbon reservoir. The cross-section includes an "overburden" (102) extending from the surface of the earth (104) to a "seal" (106) above the reservoir formation (108). The term overburden (102) denotes all formations lying above the reservoir formation (108) currently of interest and may consist of rock formations of other types including other potential hydrocarbon reservoirs, such as shallow coalbed methane reservoirs (110) not currently being studied or developed. Typically, the term overburden (102) is associated with geological formations not currently of economic interest. However, the characteristics of the overburden (102) may contain drilling hazards, such as faults zones, over-pressure zones, and shallow gas pockets, and thus be of interest to drillers accessing the reservoir formation (108).

The seal (106) is typically a geological formation with a low permeability that strongly inhibits the flow of fluids, including hydrocarbons, through it. Thus, especially when combined with topographic highs (112), such as anticlines and horsts, the seal (106) may trap the hydrocarbons in the reservoir formation (108) and prevent their escape into the overburden or to the surface of the earth (104) as "seeps." Where this trapping occurs hydrocarbon reservoirs (122) may form in the reservoir formation (108). For example, gas "caps" (114) may form immediately beneath the seal (106) overlying the structural highs (112). Gas tends to accumulate in these gas caps because gas may be more buoyant than oil or brine that may also occupy the porous reservoir formation (108). However, in some cases gas may also become trapped within low permeability, or "tight" geological formations (116) deeper within the reservoir. Beneath the gas cap (114) an oil leg (118) may form. This sequence, with increasing depth, of gas cap (114), oil leg (118), underlain by brine or fresh water is a result of the relative buoyancy of gas, oil and brine or fresh water. A person of ordinary skill in the art will be aware that some hydrocarbon reservoirs (122) contain only or mainly gas, while other hydrocarbon reservoir may contain only or mainly oil. This relative quantity of oil and gas may be determined by the burial and temperature history of the source rock (120) over geological time. This is discussed further below in the context of FIG. 2.

The source of hydrocarbons present at the current time within the hydrocarbon reservoir (122) is usually a geological formation rich in organic materials, typically kerogen. Such a formation is typically described as a hydrocarbon "source rock", or simply a source rock (120). The source rock (120), in most cases, is located beneath the hydrocarbon reservoir (108) (because hydrocarbons, being more buoyant than brine or fresh water, tend to migrate upward after they are formed through the geological formations above the source rock (120) until they become trapped by the seal (106). In FIG. 1 the source rock (120) is portrayed immediately below the hydrocarbon reservoir formation (108) and while this is often the case, in other cases the source rock (120) may be separated from the reservoir formation (108) by one or more intermediate layers (not shown).

Source rocks (120) vary substantially in how prolific they are in the production of hydrocarbon. The quantity of hydrocarbons produced by a source rock may depend on its volume (a product of the lateral extent and the net thickness of the source rock (120)), its organic richness (the fraction of the source rock composed of organic material) and its thermal maturity.

Source rocks are a result of physical, biochemical, and geologic processes during and after deposition. They are typically a fine-grained, carbon- and oxygen-rich sedimentary rock. The amount and type of organic matter incorporated into the source rock at the time of deposition may be controlled in part by environmental and depositional conditions at the geological time of deposition. Typically, source rocks form where environmental conditions support high levels of biologic activity that favor the production of large quantities of organic materials, and where depositional conditions concentrate and preserve this material until it is buried by later sediments. Organic content is controlled both by the nutrient content of the environment and the oxygen content of the water column at the time of deposition, and might include wood or plant debris, and/or algal or bacterial components. Oxygen in the water column supports both the production of organic material by living organisms, but also the biodegradation and oxidation of the organic matter prior to burial. Thus, high oxygen levels near the surface of the water, promoting growth, and low oxygen levels at the base of the water column (i.e., at and near the seabed or lake-bed), inhibiting biodegradation and oxidation, are ideal for source rock deposition.

A common metric for distinguishing high quality source rock from low quality source rock is "total organic content" (TOC). TOC is the concentration of organic material in a source rock as represented by the weight percent of organic carbon. A value of approximately 0.5% total organic carbon by weight percent is often considered the minimum for an effective source rock although values exceeding 10% are known to exist.

In many cases, over geologic time the environmental and depositional conditions may have fluctuate producing alternating fine layers of high quality (prolific) and low quality (unproductive) source rock even within a single geological formation regarded as source rock. Thus, although source rock (120) is depicted as being a uniform layer a more realistic representation may be given in FIG. 2.

Figure 2:
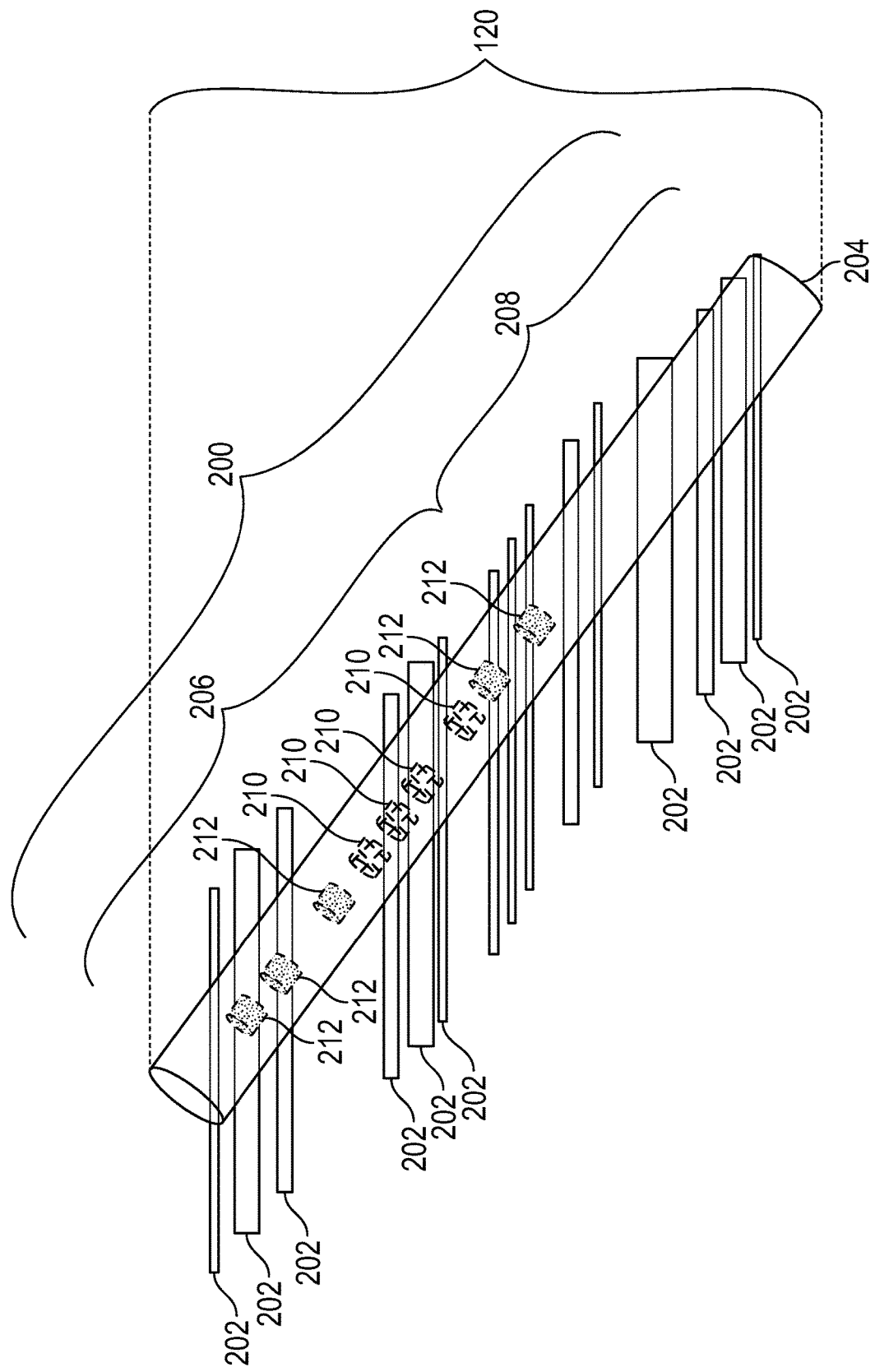
FIG. 2 depicts a source rock formation in accordance with one or more embodiments.

FIG. 2 depicts a layer of source rock (120) in accordance with one or more embodiments. The layer of source rock (120) may be composed of alternating layers of high TOC (202) and other layers with low TOC. The net thickness of the source rock layer (120) may be determined by the total thickness of all the layer of high TOC (202) lying within the source rock layer (120). Due to the possible presence of intervening low TOC layers, it is clear to one of ordinary skill in the art that the net thickness of source rock must be equal to or less than the thickness of the source rock layer (120).

To determine the net thickness of source rock a segment (200) of a wellbore (204) may be drilled through the source rock layer (120) and core samples may be taken continuously, or at intervals along the length of at least a portion of the wellbore (204). The portion of the segment (200) of the wellbore (204) in which core samples are collected continuously, or at densely spaced intervals may be termed the "data portion" (206). In accordance with some embodiments, the portion of the segment (200) of the wellbore (204) in which few or no core samples are collected may be termed the "prediction portion" (208).

In accordance with one or more embodiments these core samples may be divided into a first plurality of core samples (210) and a second plurality of core samples (212). In some embodiments, the first plurality of core samples (210) and the second plurality of core samples (212) may consist of the same cores, that is to say the first plurality and the second plurality (212) may be identical. In other embodiments, the first plurality of core samples (210) and the second plurality of core samples (212) may consist of different core samples. The first plurality (210) and the second plurality (212) of core samples may be collected simultaneously or at different times. The first plurality (210) and the second plurality (212) may each be collected either at the time the well is drilled or afterwards.

FIG. 3A-3B depict two methods of collecting core samples, in accordance with one or more embodiments. A typical coring tool includes a hollow drill bit, called a "coring bit," that is advanced into the formation wall so that a sample, called a "core sample," may be removed from the formation. A core sample may then be transported to the surface, where it may be analyzed to assess, among other things, the TOC of the core sample. Downhole coring operations generally fall into two categories: axial and sidewall coring. "Axial coring," or conventional coring, involves applying an axial force to advance a coring bit into the bottom of the well. Typically, this is done after the drill string has been remove from the wellbore, and a rotary coring bit with a hollow interior for receiving the core sample is lowered into the well on the end of the drill string or on wireline. Typically, core samples acquired in this manner, so called "whole core" may be 1.75-5.25 inches (4.4 and 13.3 cm) in diameter and 2 or 3 feet in length.

By contrast, in "sidewall coring," the coring bit is extended radially from the downhole tool and advanced through the side wall of a drilled borehole. In sidewall coring, the drill string typically cannot be used to rotate the coring bit, nor can it provide the weight required to drive the bit into the formation. Instead, the coring tool itself must generate both the torque that causes the rotary motion of the coring bit and the axial force, called weight-on-bit ("WOB"), necessary to drive the coring bit into the formation. Another challenge of sidewall coring relates to the dimensional limitations of the borehole. The available space is limited by the diameter of the borehole. There must be enough space to house the devices to operate the coring bit and enough space to withdraw and store a core sample. A typical sidewall core sample is about 1.5 inches (about. 3.8 cm) in diameter and less than 3 inches long (about. 7.6 cm), although the sizes may vary with the size of the borehole.

FIG. 3A depicts the collection of a whole core sample (302) during drilling of a wellbore (300) through a subterranean region. A drilling rig (304) located on the surface of the earth (306) supports a rotational actuator (308) connected to the upper end of a "drillstring" (310) (a plurality of interconnected drill pipes) that extend into a wellbore (312). The rotational actuator (308) may be a "top drive" motor suspended from a crane attached near the summit of the drilling rig (304). Drilling mud may be pumped from a drilling mud reservoir (314), via a pump (316), down the center (318) of the drillstring (310) out of the coring bit (320) and back to the surface of the earth (306) via the annulus (322) between the drillstring and the wellbore wall (324). The lower end of the drillstring (310) may consist of a bottomhole assembly (BHA) (326) that may include a plurality of logging sensors (328) and telemetry systems (330) to communicate data and instructions to and from the surface. The drillstring (310) may further include a core sample barrel (332) as it passes through the aperture (334) in the center of the coring bit (320). As the coring bit (320) bores through the subterranean region a cylindrical whole core protrudes through the aperture (334) at the center of the coring bit (320) and may be retained within the core sample barrel (332) for later transportation to the surface of the earth (306). In some embodiments, the core sample may be transported to the surface by withdrawing the entire drillstring (310), BHA (326), and the core sample barrel (332). In other embodiments, a wireline (not shown) may be pumped down the center (318) or the drillstring (310), attached to an inner core holding chamber not shown and then withdrawn through the center (318) of the drillstring. This latter embodiment is often referred to as "wireline continuous coring".

FIG. 3B depicts an alternative method of core sample collection in accordance with one or more embodiments. FIG. 3B and FIG. 3A may contain elements in common and in the interests of brevity only those elements that differ between FIG. 3B and FIG. 3A are described with respect to FIG. 3B. In FIG. 3B, a sidewall coring tool (340) may be lowered into the wellbore (312) suspended by a wireline (342) or coiled tubing (not shown)) from the drilling rig (304). At the desired depth within the wellbore the sidewall coring tool (340) may be pushed against the wellbore wall. In some embodiments this may be accomplished using an extendable and tractable arm (344) braced against the opposing side of the wellbore wall (324b).

In some embodiments, a hollow coring bit (346), driven by a rotation activator (not shown) within the sidewall coring tool (340) may then drill into the borehole wall (324) to create a short cylindrical core sample (348) protruding into the interior of the hollow coring bit (346). This cylindrical core sample (348) may then be retrieved and stored within a core-holding barrel (328) inside the sidewall coring tool (340). As many as 75 core samples or more can be recovered on one run of the sidewall coring tool (340) into the wellbore (312) and each is typically approximately 0.9 in. [2.3 cm] in diameter by 2 in. [5.0 cm] in length.

In other embodiments, percussion cores may be taken by firing hollow "bullets" into the formation. The bullets are attached to the tool by fasteners, and are retrieved, along with the core inside, by pulling up the tool and the fasteners. Percussion coring tools typically hold 20 to 30 bullets. Typical cores retrieved by a percussion tool may be approximately 1 in. [2.5 cm] in diameter by 1¾ in. [4.5 cm] in length.

In either case, after retrieving a core the retractable arm (344) may be retracted, and the sidewall coring tool (340) raised or lowered, using the wireline (342) or coiled tubing (not shown), to the next depth at which a core sample is desired and where the process may be repeated.

Core samples from the reservoir may be collected only from locations where existing wellbores penetrate the reservoir or where new wellbores are being drilled through the reservoir. There can be large distances of many hundreds to several thousands of feet between wellbores and consequently cores only sample the reservoir very sparsely. In addition, the process of coring is time consuming and costly in comparison to well logging that is discussed next.

In addition to collecting core samples of a source rock (or indeed any type of rock), well logs may be recorded along the wellbore. A well log may record physical parameters of the formation penetrated by the wellbore at dense regular axial intervals. For example, a typical sample interval may be 6 inches (15 cm). The well logs recorded may include, without limitation, a sonic log, a deep resistivity log, a density log, a neutron porosity log, a spectral gamma ray log, a uranium log, a thorium log, a potassium log, and a gamma ray log.

Figures 4A, 4B:
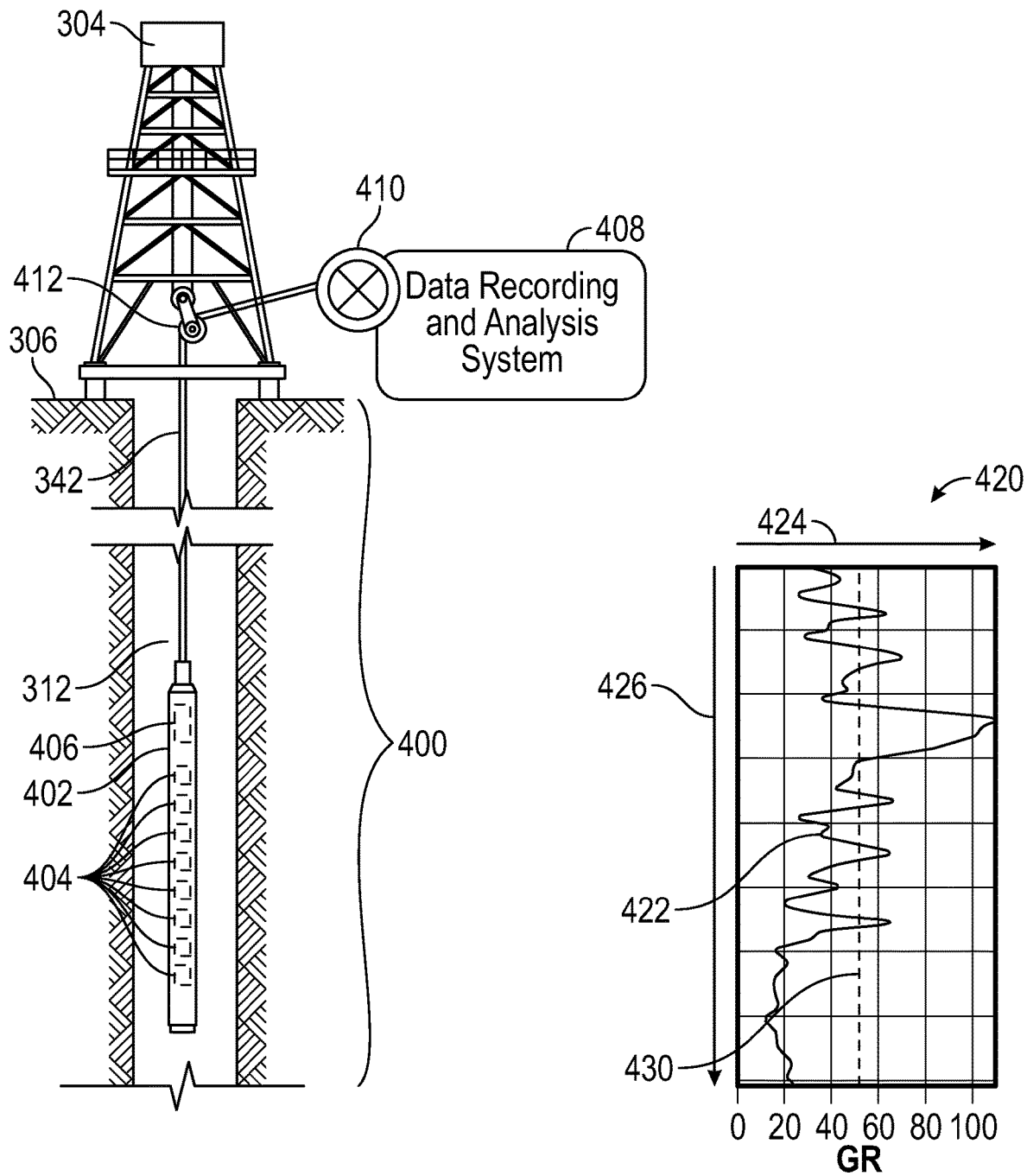
FIGS. 4A and 4B depict systems in accordance with one or more embodiments.

FIG. 4A depicts a well logging tool (402) deployed in a wellbore (312) penetrating subterranean region of interest (400). The well logging tool (402) may include a variety of sensors (404) designed to measure different physical quantities. In some embodiments each physical quantity may be measured by a distinct well logging tool carrying sensors designed to measure the physical quantity and the plurality of distinct well logging tools may be screwed together to form a composite well logging tool (402). Further, the well logging tool (402) may include a power and telemetry electronics package (406) designed to distribute power to the sensors (404) and to communicate data from the sensors (404) to a data recording and analysis system (408) on the surface of the earth (306). In some embodiments, the well logging tool (402) may be suspended from a drilling rig (304) by a wireline (342) running from a winch (410) via a pully system (412) attached to the drilling rig (304) to the well logging tool (402).

FIG. 4B shows a typical well log (420) in accordance with one or more embodiments. Specifically, FIG. 4B shows a gamma ray well log with the curve (422) showing the value of detected gamma ray intensity, indicated on the horizontal axis (424), as a function of depth, indicated on the vertical axis (426). FIG. 4B further shows a cut-off value (430) of gamma ray intensity. The function of the cut-off value is discussed below in the context of FIG. 10.

Figure 5:
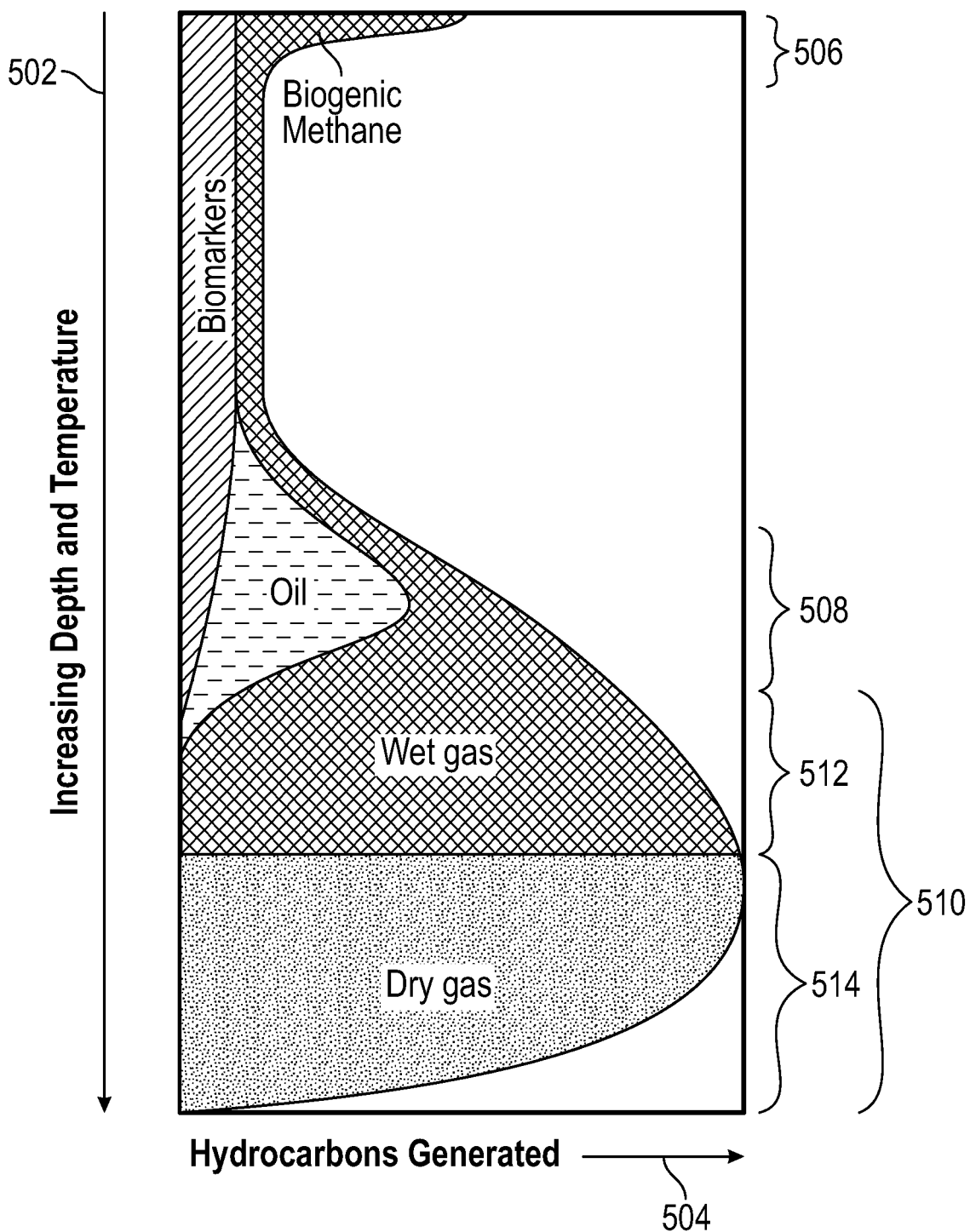
FIG. 5 shows a graph in accordance with one or more embodiments.

In addition to the net thickness, the thermal or burial history of source rocks may be important in determining the quantity and type of hydrocarbons they have generated. FIG. 5 is a graphical representation showing hydrocarbon generation in relation to depth, indicated on the left vertical axis (502), and quantity of various types of hydrocarbons, indicated on the horizontal axis (504) in accordance with one or more embodiments. Thermal maturity of a source rock refers to the amount of heating a source rock has experienced over its geological lifetime. Generally, the temperature increases with depth (502) and hence, increased depth corresponds to increased temperatures. However, the relationship between depth (502) may not be linear and the rate of increase may vary between geographic regions.

Heating a source rock rich in organic matter may transform kerogen, or insoluble organic matter, within the source rock into hydrocarbons such as oil, gas, and bitumen. Kerogen is consumed during thermal maturation, whereas bitumen is an intermediary formed at low maturity from kerogen and consumed at higher maturities in formation of oil and gas. Thermal maturity may be used to identify and characterize prospective hydrocarbon reservoirs. Based on thermal maturity values, source rocks may be categorized in terms of their ability to generate hydrocarbons. Immature, or thermally unaltered, source rocks may generate biogenic natural gas (504). Rocks that have experienced intermediate temperatures and associated depths within a certain formation having a specific thermal gradient, may be referred to as being within the "oil window" (408). Rocks that have experienced temperatures higher temperatures and associated depths within a certain formation having a specific thermal gradient, may be referred to as being within the "gas window" (510). The gas window may be further subdivided into a "wet gas" window (512) and a "dry gas" window (514). Wet gas may produce oil condensate when produced from the hydrocarbon reservoir, particularly in lower pore pressure regions surrounding production wells.

In accordance with some embodiments, the temperatures provided in the following paragraphs as bounding the oil window (508) and gas window (510) should be regarded as typical values. Precise values in any given case may depend upon the type of kerogen in the source rock and the pressure to which the source rock is exposed. For example, source rocks of a marine origin may be more prone to produce oil than source rocks of other origins, e.g., lacustrine or deltaic. In accordance with other embodiments, the following paragraphs describing the bounds of the oil window (508) and gas window (510) are intended to be examples, as precise values may further differ based on geologic setting. The example parameter values should not be interpreted as limiting the invention in any way.

Immature, or thermally unaltered, source rocks may generate biogenic natural gas (504). Processes that form biogenic natural gas (506) typically occur at lower temperatures, where organic matter may be less altered. In some cases, these temperatures may be below 50° C.

In accordance with one or more embodiments, as depth (502) and temperature increase, chemical changes may generate hydrocarbons such as oil, gas, and bitumen from organic matter in the rocks. Source rocks that have experienced temperatures within an intermediate range of values, for example 60° C. to 130° C. may be deemed as thermally mature rock and may generate oil. This range of temperatures, and the associated depths within a certain formation with a specific thermal gradient, may be known as the "oil window" (508). At greater depths beyond the oil window (508), rock may generate thermogenic natural gas.

Source rocks that have experienced temperatures within a higher range of values, for example 130° C. to 190° C. may have generated thermogenic natural gas. This range of temperatures, and the associated depths within a certain formation with a specific thermal gradient, may be known the "gas window" (510). In the gas window (510), kerogen may be converted directly into natural gas, and oil generated earlier at lower temperatures but still within the pores may be converted into natural gas.

When temperatures exceed 200° C., i.e., beyond the dry gas window (514) depth, thermal alteration may render the rock overmature, where hydrocarbon generation potential may be exhausted.

Core samples obtained from a hydrocarbon reservoir may be examined geochemically to determine the organic and inorganic molecules present within the core sample. Three of these methods, Induction Coupled Plasma-Mass Spectrometry (ICP-MS), X-ray fluorescence (XRF) and pyrolysis, for determining the organic and inorganic molecules, are described below.

Pyrolysis is a type of geochemical analysis in which a core sample is subjected to controlled heating in an inert gas, to or past the point of generating hydrocarbons, in order to assess its quality as a source rock, the abundance of organic material in it, its thermal maturity, and the quality of hydrocarbons it might generate or have generated. Pyrolysis is the process of thermally decomposing a sample in an inert atmosphere to analyze constituents of the sample. Pyrolysis may simulate thermal maturity and, thus, the generation of hydrocarbons if the sample has sufficient total organic carbon (TOC) content. Specifically, Rock-Eval pyrolysis may be used to analyze a source rock sample.

Figure 6:
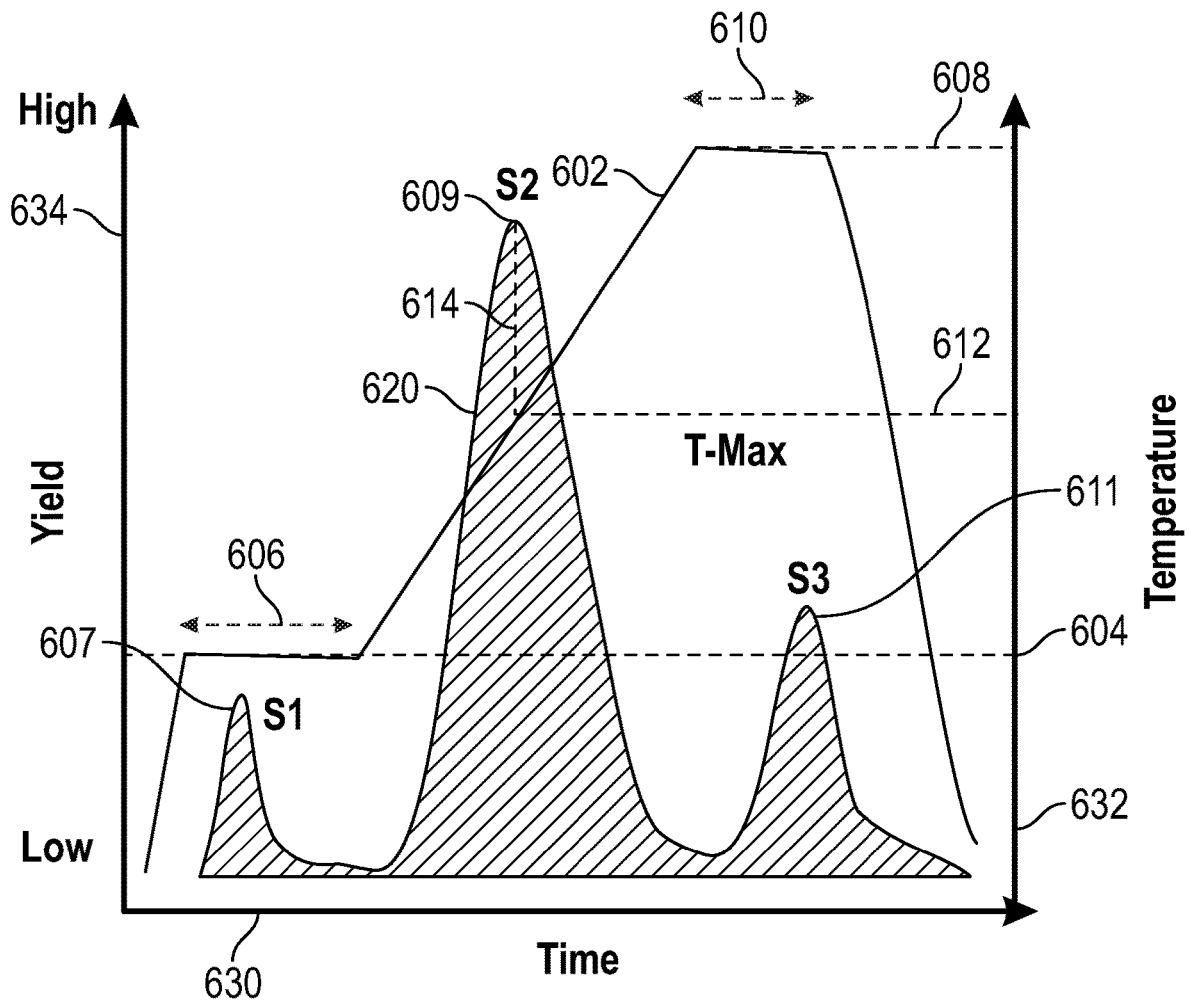
FIG. 6 shows a graph in accordance with one or more embodiments.

Pyrolysis breaks large hydrocarbon molecules into smaller molecules. This process is used to determine the quality of limestone, mudrock, or shale as a source rock. In accordance with one or more embodiments, FIG. 6 shows an example of pyrolysis analysis. Pyrolysis may be performed under hydrous or anhydrous conditions. Further, an entrained flow reactor may be used to perform a pyrolysis analysis. The core sample is heated according to a schedule (602) of temperature versus time, where time is indicated on the horizontal axis (630). Initially the core is heated to a first temperature (604) depicted on the vertical axis on the righthand side of FIG. 6 (632). The first temperature might be For example, the first temperature may be 300° C. (572° F.). The core sample may be maintained at the first temperature for a first period of time (606). The first period (606) of time may be several minutes in duration. After the first period of time (606) the temperature of the core sample may be increased at a constant rate to a peak temperature value (608). The constant rate of temperature increase may be 25° C. (45° F.) per minute and the peak temperature value (608) may be 850° C. (1,562° F.). The core sample may be maintained at the peak temperature value for a second period of time (610). The second period of time may be a few minutes. After the second period of time the temperature of the core sample may be reduced to room temperature. The reduction of the temperature may or more not take place at a constant rate. The temperature values and durations of the first and second period of time given above are intended as illustrations only.

One of ordinary skill in the art will readily appreciate that the temperature values and time durations may be varied with bounds without departing from the scope of the invention. Likewise, temperature increases and temperature decrease that have been depicted as occurring at constant rates may occur at variable rates without departing from the scope of the invention.

Returning to FIG. 6, the yield of hydrocarbons, indicated on the left-hand vertical axis (634) released by the pyrolysis temperature profile (602) is depicted by the filled curve (620) using the vertical axis on the left-hand side of FIG. 6. During the first period of time (606), free oil and gas contained within the core sample are released from the sample producing a first peak, S1, (607) in the yield curve (620). The amplitude of the first peak (607) may be termed the "first yield". During the following stage, as the core sample temperature is increased, hydrocarbon compounds including oil and gas are generated through thermal induced chemical changes ("cracking") of the insoluble kerogen, producing a second peak, S2, (609) in the yield curve (620). The amplitude of the second peak (609) may be termed a "second yield". The temperature (612) at which the second peak, S2, (609) occurs is usually denoted the temperature "T-max". T-max provides information about the thermal history of the core sample over geological time and the stage of thermal maturation that it has reached. T-max should not be confused with any geological temperature, but it may be used in characterizing the thermal maturity of the kerogen component of the mudrock or shale.

During the second period of time (610) at which the core sample is at the peak temperature (608), the kerogen may release $CO_2$ generated during the thermal cracking of the kerogen. This may appear as a third peak, S3, (611) in the yield curve (620). The amplitude of the third peak may be termed the "third yield". The TOC and hydrogen index HI may be indirectly determined from pyrolysis such that:

$$TOC = \frac{(0.082(S_1 + S_2) + S_4)}{10} \quad \text{Equation (1)}$$

and $$HI = \frac{S_2}{TOC} \times 100 = \frac{S_2}{(0.082(S_1 + S_2) + S_4)/10} \times 100, \quad \text{Equation (2)}$$

where S4 is the residual carbon concentration within the sample following pyrolysis.

X-ray fluorescence (XRF) is the emission of characteristic "secondary" (or fluorescent) X-rays from a material that has been excited by being bombarded with high-energy X-rays or gamma rays. This phenomenon is the basis of elemental analysis and chemical analysis in many fields, including, geochemistry.

When materials are exposed to short-wavelength X-rays or to gamma rays, ionization of their component atoms may take place. Ionization consists of the ejection of one or more electrons from the atom, and ionization may occur if the atom is exposed to radiation with an energy greater than its ionization energy. X-rays and gamma rays can be energetic enough to expel tightly held electrons from the inner orbitals of the atom. The removal of an electron in this way makes the electronic structure of the atom unstable, and electrons in higher orbitals "fall" into the lower orbital to fill the hole left behind. In falling, energy is released in the form of a photon, the energy of which is equal to the energy difference of the two orbitals involved. Thus, the material emits radiation, which has energy characteristic of the atoms present. The term fluorescence is applied to phenomena in which the absorption of radiation of a specific energy results in the re-emission of radiation of a different energy (generally lower). Each element has electronic orbitals of characteristic energy.

There are a limited number of ways in which an electron from an outer shell (K, L or M) can drop into a vacant space in an inner orbital. The main transitions are given names: an L→K transition is traditionally called Kα, an M→K transition is called Kβ, an M→L transition is called Lα, and so on. Each of these transitions yields a fluorescent photon with a characteristic energy equal to the difference in energy of the initial and final orbital.

In order to excite the atoms, a source of radiation is required, with sufficient energy to expel tightly held inner electrons. Conventional X-ray generators are most commonly used, because their output can readily be "tuned" for the application, and because higher power can be deployed relative to other techniques. X-ray generators in the range 20-60 kV are used, which allow excitation of a broad range of atoms. The fluorescent X-rays emitted by the material sample are directed into a solid-state detector which produces a "continuous" distribution of pulses, the voltages of which are proportional to the incoming photon energies. This signal is processed by a multichannel analyzer (MCA) which produces an accumulating digital spectrum that can be processed to obtain analytical data.

Figure 7:
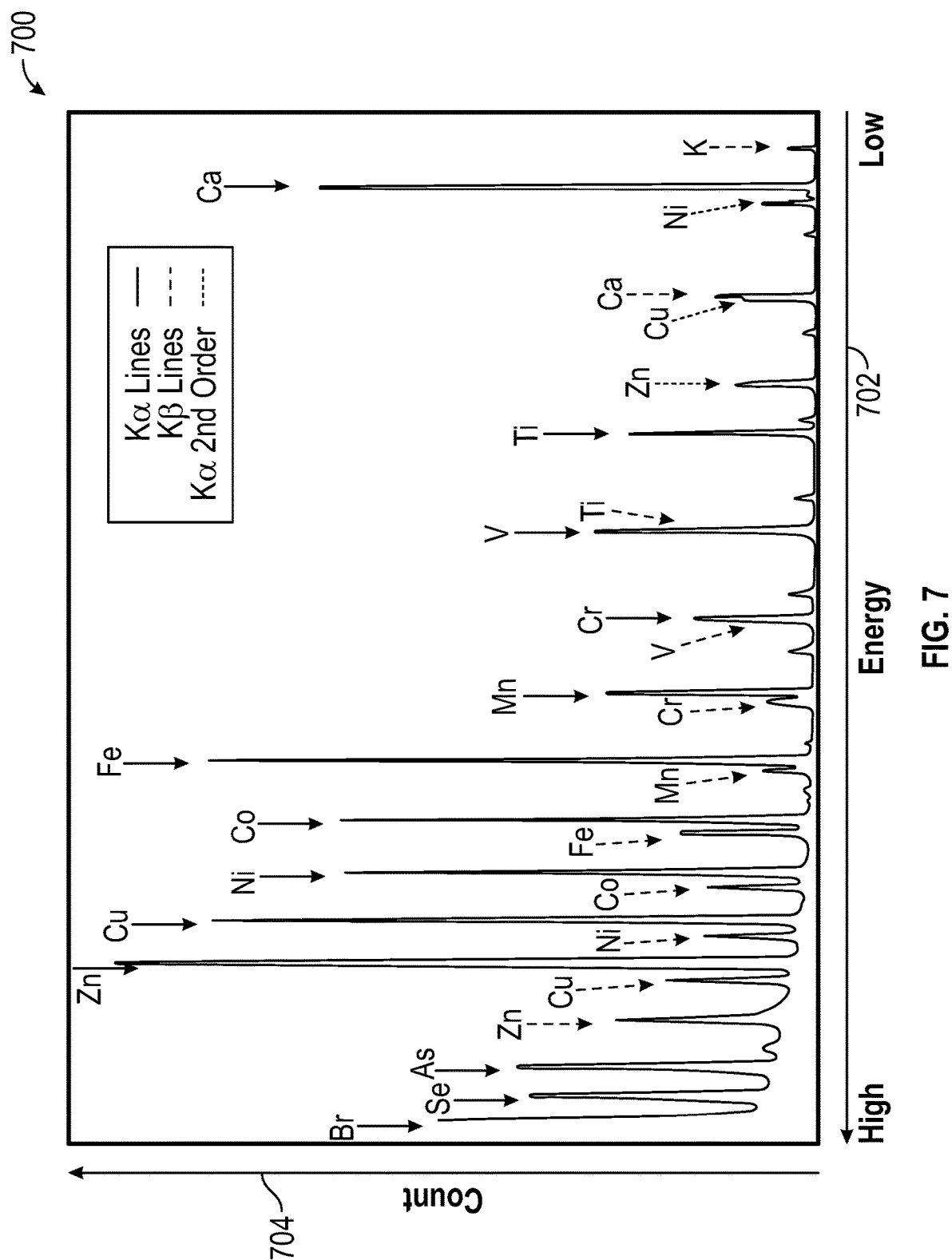
FIG. 7 shows a graph in accordance with one or more embodiments.

FIG. 7 shows a fluorescence X-ray spectrum (700) in accordance with one or more embodiments. The horizontal axis (702) indicates fluorescent X-ray energy decreasing to the right, while the vertical axis (704) indicates the number count of emitted fluorescent X-rays emitted at each energy. The energy of each peak is characteristic of the material fluorescing and the type of the electron orbital transmission generating the photon and the amplitude of the peak is characteristic of the relative abundance of the material in the sample. Thus, the peaks may be labelled with the material giving rise to the peak as shown in FIG. 7.

Inductively coupled plasma mass spectrometry (ICP-MS) is a type of mass spectrometry that uses an inductively coupled plasma to ionize the sample. It atomizes the sample and creates atomic and small polyatomic ions, which are then detected. It is known and used for its ability to detect metals and several non-metals in liquid samples at very low concentrations.

Figure 8:
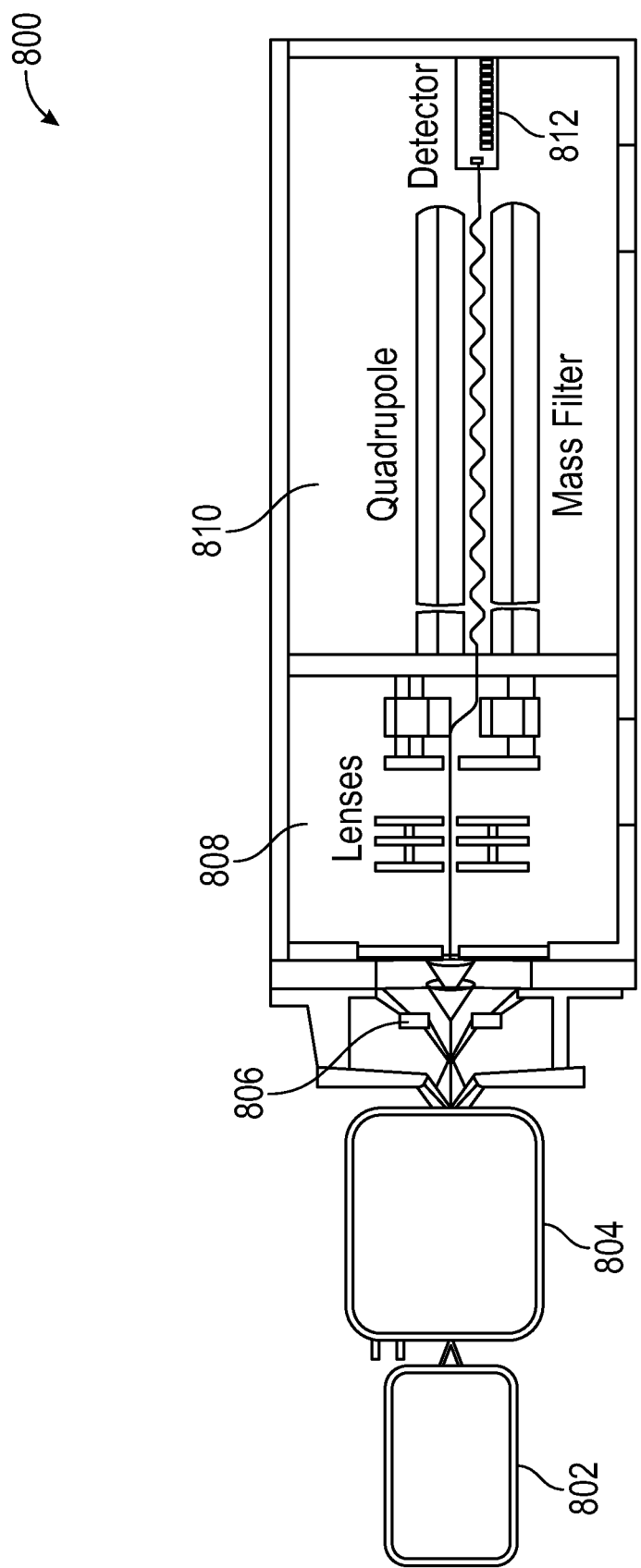
FIG. 8 shows a system in accordance with one or more embodiments.

There are six fundamental compartments of a single quadrupole ICP-MS: the sample introduction system (802), an inductively coupled plasma (ICP) within a torch (804), an interface (806), an ion optics system (808), a mass filter (810) and a detector (812). FIG. 8 shows a simple depiction of the instrument (800) for ICP-MS.

Samples are prepared in the sample introduction system (802) and transferred to the argon plasma in the torch (804). The high-temperature plasma atomizes and ionizes the sample, generating ions which are then extracted through the interface (806) and into a set of electrostatic lenses called the ion optics system (808). The ion optics system (808) focuses and guides the ion beam into the mass filter (810). In some embodiments, the mass filter (810) is a quadrupole mass analyzer. The mass analyzer separates ions according to their mass-charge ratio, and these ions are measured at the detector (812).

The first step in analysis is the introduction of the sample in the sample introduction system (802). This has been achieved in ICP-MS through a variety of means. In accordance with one or more embodiment, laser ablation may be used. In laser ablation, a pulsed UV laser may be focused on the sample to create a plume of ablated material which can be swept into the plasma. Geochemists may use this method to spatially map the isotope composition in cross-sections of rock samples, a tool which may be lost if the rock is pulverized and introduced and introduced into the plasma by other means.

The plasma used in an ICP-MS is typically made by partially ionizing argon gas (Ar→Ar++e−). The energy required for this reaction may be obtained by pulsing an alternating electric current in load coil that surrounds the plasma torch with a flow of argon gas. After the sample is injected, the plasma ionizes these atoms so that they can be detected by the mass spectrometer. The inductively coupled plasma (ICP) for spectrometry is sustained in a torch that consists of three concentric tubes, usually made of quartz. The end of this torch is placed inside an induction coil supplied with a radio-frequency electric current. To maximize plasma temperature (and hence ionization efficiency) and stability, the sample should be introduced through the central tube using laser ablation. The sample enters the central channel of the ICP, evaporates, molecules break apart, and then the constituent atoms ionize. At the temperatures prevailing in the plasma a significant proportion of the atoms of many chemical elements are ionized, each atom losing its most loosely bound electron to form a singly charged ion.

For coupling to mass spectrometry, the ions from the plasma are extracted through a pair of coaxial nickel (or platinum) cones separating the plasma from the mass spectrometer vacuum chamber. The first cone (in contact with the plasma) is called the sample cone, and the second is called the skimmer cone. Ions, photons and neutral atoms or molecules are extracted from the plasma into the interface region via a small orifice at the tip of the sample cone (~1 mm diameter). A mechanical roughing pump (not shown) is used to maintain an interface pressure (between the cones) of ~150-300 Pa. As ions enter this interface region, the dramatic reduction in pressure causes a supersonic expansion of the ions, generating a so-called free jet. Ions are subsequently extracted through an even smaller orifice in the skimmer cone (~0.45 mm diameter), and into the main vacuum chamber which is held under high vacuum ($7\times10^{-5}$-$1\times10^{-3}$ Pa) by a turbomolecular pump (not shown). At this pressure, ions can be guided effectively by the charged surfaces, called electrostatic lenses, of the ion optics system (808).

After transiting through the ion optics system (808), ions arrive at the mass filter (810). Several different types of mass filter (810) may be used for ICP-MS; these include quadrupole, magnetic sector and (rarely) time-of-flight (TOF). By far the most common type is the quadrupole mass analyzer. As is the case with all mass analyzers, a quadrupole is essentially a mass filter, separating ions based on their m/z ratio (defined as the mass of an ion divided by its charge). A quadrupole consists of four parallel hyperbolic or cylindrical metallic rods (normally 15-20 cm long) positioned in a square array. Radio frequency alternating current (AC) and direct current (DC) potentials are applied to the rods, creating a time-varying electric field in the centre through which ions pass. For an ion with a particular m/z ratio, only specific combinations of AC and DC potentials result in a stable ion flight trajectory through the quadrupole. Ions with unstable trajectories collide with the rods and are not transmitted through the quadrupole. These voltages can be ramped very rapidly, allowing the entire mass range to be scanned within a matter of milliseconds.

The most common detector used for ICP-MS is an electron multiplier (EM). Positively-charged analyte ions strike the first dynode of the detector which is held at a high negative voltage. The impact of the ion on the detector causes the emission of several electrons from the surface, which, in turn, strike the next dynode releasing more electrons. This process (called secondary emission) continues, generating an amplification cascade that culminates in a signal large enough to be measured reliably as an ion 'count'. In this way, an EM can generate a measurable signal pulse from the impact of a single ion on the detector, conferring very high analytical sensitivity. In fact, detection limits in ICP-MS are far superior to flame atomic absorption and are comparable (or superior) to graphite furnace atomic absorption.

The concentration of a sample can be determined through calibration with certified reference material such as single or multi-element reference standards. Other mass analyzers coupled to ICP systems include double focusing magnetic-electrostatic sector systems with both single and multiple collectors, as well as time of flight systems (both axial and orthogonal accelerators have been used).

Well logs may be recorded in a wellbore penetrating a hydrocarbon reservoir by inserting a well logging tool into the wellbore and making a making a measurement of a physical parameter of the rock formation traversed by the wellbore. Several different well log types may be recorded at the same time. This may be achieved by attaching multiple logging tool types together into a logging "string" before inserting the string into the wellbore. Typically, each well log type will record a measurement at regular intervals within the well. The regular interval may be a distance interval along the wellbore or a temporal interval as the string is inserted or withdrawn from the wellbore. For example, a measurement may be made at six-inch intervals along the wellbore, although the interval may be more or less than six inches. Alternatively, the measurement may be made at one second intervals in time, although the interval may be more or less than one second.

In accordance with one or more embodiments, a first plurality of core samples (210) and a second plurality of core samples (212) may be obtained from a data portion (206) of a segment (200) of a wellbore (204). The first plurality of core samples (210) may be analyzed using ICP-MS and/or X-ray fluorescence to determine the relative abundance of inorganic elements present in each core sample and the results arranged as a matrix with the first column representing the depth at which the sample was recorded and the second and subsequent columns representing the relative abundance of one element, e.g., Mo. Each row of the matrix represents the relative abundance of all the elements recorded from a single core sample from the first plurality of core samples.

Similarly, the second plurality of core samples may by analyzed using pyrolysis to determine the TOC of each of the core samples. The TOC values may be arranged as a matrix with the first column representing the depth at which the sample was recorded and the second column representing the TOC. Each row of the matrix represents the relative abundance of all the elements recorded from a single core sample from the second plurality of core samples.

Furthermore, one or more well logs (420) may be recorded along the segment (200) of the wellbore (204). However, even though the well log (420) may be composed of measurements made at closely spaced intervals along the wellbore (204), the first plurality of core samples (210), the second plurality of core samples (212) and the well log (420)

measurements may all be recorded at different depths. Table 1 displays an illustrative example of a small portion of the well log (420), first plurality (210) and second plurality (212) of core samples.

TABLE 1

Initial Data Depth Distribution

| Wireline Data (e.g., GR) | | Second plurality of core samples: Organic Data (e.g., TOC) | | First plurality of core samples: Inorganic Data (e.g., Mo) | |
|---|---|---|---|---|---|
| Depth | Value | Depth | Value | Depth | Value |
| 10,000.00 | 75 | | | | |
| | | 10,000.20 | 1.5 | | |
| | | | | 10,000.35 | 95 |
| 10,000.50 | 115 | | | | |
| | | 10,000.75 | 2.3 | | |
| | | | | 10,000.85 | 85 |
| 11,000.00 | 93 | | | | |
| | | 11,000.25 | 3.3 | | |
| | | | | 11,000.45 | 100 |

In accordance with one or more embodiments, the all the data may be interpolated and depth-matched to a common depth. For example, in some embodiments the common depths may be the depths at which the wireline data is recorded. In other embodiments, the common depths may be the depths at which the first plurality of core samples were collected. In other embodiments, the common depths may be the depths at which the first plurality of core samples were collected. In still further embodiments, the common depths may be an independent set of convenient depths.

The interpolation may be performed using nearest-neighbor interpolation, linear or polynomial interpolation, spline interpolation, or mimetic interpolation. Furthermore, the interpolation may be performed by any interpolation known to one of ordinary skill in the art without departing from the scope of the invention. Table 2 displays an illustrative example of a small portion of the well log (420), first plurality (210) and second plurality (212) of core samples after interpolation to a set of common depths. It will be readily apparent to one of ordinary skill in the art that forming a dataset composed of well logs, and measured TOC and measured inorganic data at a set of common depths greatly facilitates further cross-calibration and validation of the data values.

TABLE 2

After depth-matching, interpolation, and concatenation.

| Wireline Data (e.g., GR) | | Second plurality of core samples: Organic Data (e.g., TOC) | | First plurality of core samples: Inorganic Data (e.g., Mo) | |
|---|---|---|---|---|---|
| Depth | Value | Depth | Value | Depth | Value |
| 10,000.00 | 75 | 10,000.00 | 1.4 | 10,000.35 | 93 |
| 10,000.50 | 115 | 10,000.50 | 2.1 | 10,000 | 88 |
| 11,000.00 | 93 | 11,000.00 | 3.3 | 11,000.00 | 99 |

In accordance with one or more embodiments, a cross-checked total organic content (xc-TOC) may be determined at each common depth. The matrix format of the data facilitates the automatic calculation of the hydrogen index (HI), the oxygen index (OI), the production index (PI), the normalized S1 (Norm.S1), and the normalized S1 index (Norm.S1_Index) and the filtering of the TOC values using these data. It will be readily apparent to those of ordinary skill in the art that the raw or original TOC values cannot be used to guarantee a source rock potential as the measurements may have been contaminated with oil or other drilling additives. This step is necessary to remove the possibility of sample contamination.

In accordance with one or more embodiments, the cross-checking process may be implemented in the following manner. The cross-checking may include comparing HI, OI, PI, Norm_S1 and Norm_S1_Index for each sample depth against cut-off values and discarding those samples, including the TOC values of those samples, that do not satisfy the cut-off comparison conditions. The matrix format of the data may facilitate the evaluation of the following conditions:

1. A good quality TOC data may be equal to or greater than 0.5. A new subset of samples, $TOC_{New}$, satisfying this criterion may be written as:

$$TOC_{New} = (TOC_{Original} \geq 0.5).$$

2. A second filter may be applied to the new TOC to extract only those samples with $S2 \geq 1$. A new subset of samples, $TOC_{S2_{filtered}}$, satisfying this criterion and the previous criterion related to the value of TOC may be written as:

$$TOC_{S2_{filtered}} = TOC_{New}(S2 \geq 1).$$

3. A third filter may be applied to the $TOC_{S2_{filtered}}$ samples to discard points where $PI \geq 0.44$ that may be indicative of unreliable samples that may have been contaminated by non-reservoir hydrocarbons, such as oil-based drilling muds. Hence, we keep only those points corresponding to where $PI < 0.44$:

$$TOC_{PI_{filtered}} = TOC_{S2_{filtered}}(PI < 0.44).$$

4. A fourth filter may be applied to the samples $TOC_{PI_{filtered}}$ value to discard those points corresponding to where the S1_Norm>100, that may have been contaminated by non-reservoir hydrocarbons, such as oil-based drilling muds. Hence, we only keep those points corresponding to where S1_Norm is equal to or less than 100:

$$TOC_{S1.Norm_{filtered}} = TOC_{S2_{filtered}}(S1_{Norm} \leq 100).$$

5. A fifth filter may be applied to the $TOC_{S1.Norm_{filtered}}$ to discard those points corresponding to where the S1_Norm_Index is greater 1 indicative of unreliable (Contaminated/Migrated HC) data points. Hence, we only keep those points corresponding to where S1_Norm_Index is equal to or less than 1:

$$xc\text{-}TOC = TOC_{S1.Norm_{filtered}}(S1.Norm_{index} \leq 1).$$

The cross-checked TOC, xc-TOC, produced after applying all the above filters represent the TOC values of all the sample deemed free from potential contamination. While specific values of cut-off values, such as $PI \geq 0.44$, have been provided for this embodiment, these values should be interpreted as illustrative and not as limiting the scope of the invention. In other embodiments, different cut-off values may be used.

In accordance with one or more embodiments, a validated total organic content (vTOC) may be determined from the cross-check total organic content, xc-TOC, and the relative abundances of inorganic materials. In some embodiments, the relative abundances of the sensitive elements (Mn and Mo) may be used to validate the TOC values. In some reservoirs, high levels of TOC may be correlated with high values of the relative abundance of sensitive elements, such as Mn and Mo. In other reservoirs the relationship may be reversed, and high levels of TOC may be correlated with low values of the relative abundance of sensitive elements. In any particular reservoir the value of xc-TOC may be correlated with the relative abundance of sensitive elements to provide greater confidence in the xc-TOC. These xc-TOC values may be termed validate TOC values (vTOC). The resulting vTOC values may be regarded with a high degree of certainty as accurate estimates of the true value of TOC. xc_TOC values that do not correlate well with the relative abundance of sensitive elements are discarded and excluded from the set of vTOC values.

In accordance with one or more embodiments, the vTOC values may be compared with one or more well logs and a cut-off value determined. In some embodiments, the cut-off value may be a value of one or more logs above which indicate source rock and below which indicates non-source rocks for the purposes of net source rock thickness determination. In other embodiments the converse may be true, that is the cut-off value may be a value of one or more logs below which indicate source rock and above which indicates non-source rocks for the purposes of net source rock thickness determination. In some embodiments the cut-off value may be a value of a functional of one or more well logs, e.g., $f_{cutoff} < f = a*GR + b*DEN$, where a and b are constants, GR is the gamma ray log value, and DEN is the density log value. The commonly used logs are gamma ray (GR), sonic (DT), density (RHOB), neutron porosity (NPHI), and deep resistivity (RDEEP). In some embodiments, the values of these logs that correspond to vTOC values may be a high value or a low value. In other embodiments, the vTOC value may lie in a range between low and high values.

Figure 9:
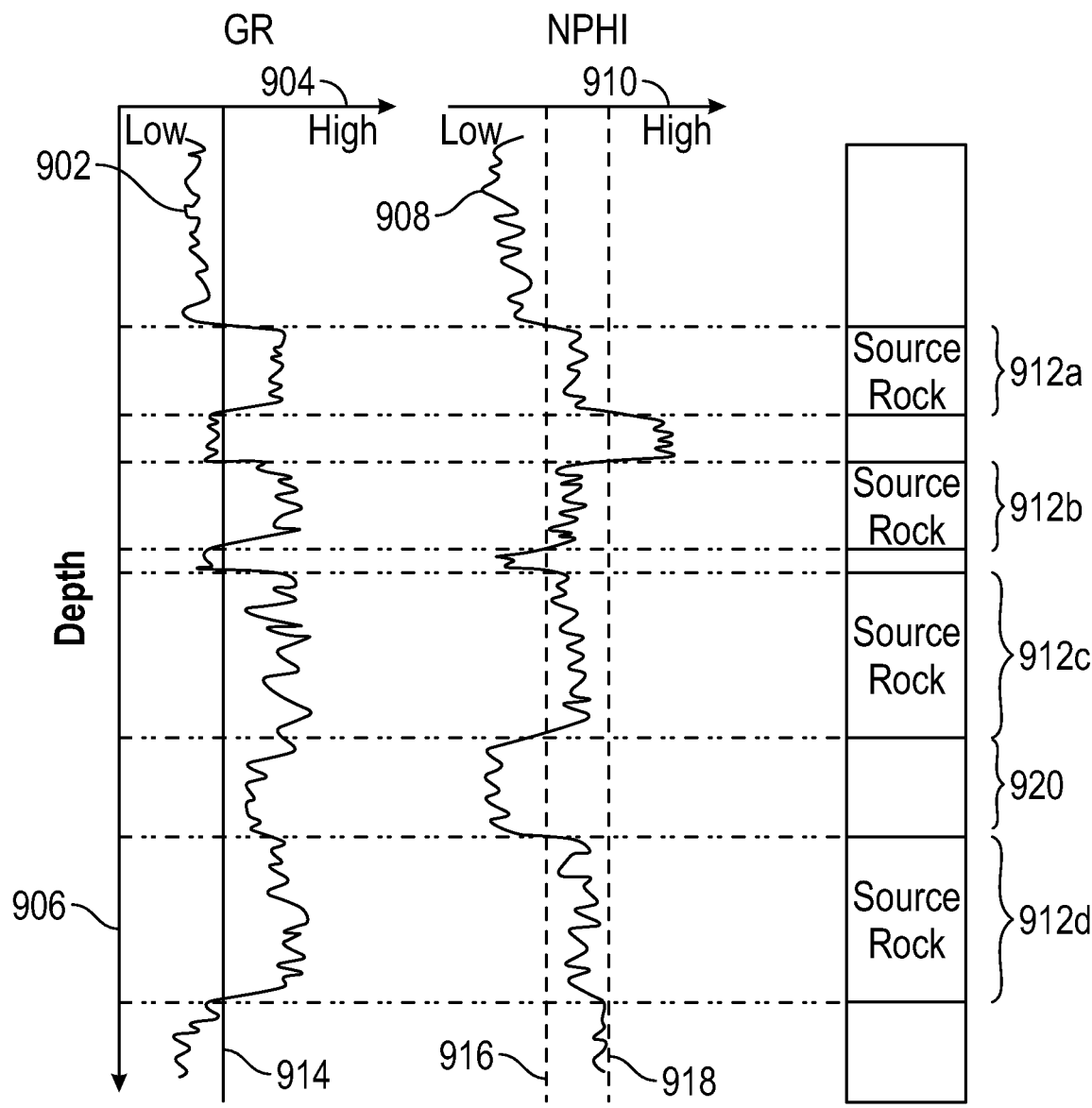
FIG. 9 shows a display of well logs and source rock layers in accordance with one or more embodiments.

FIG. 9 shows an illustrative example of comparison of the vTOC values with two well logs in a data portion (206) of a segment (200) of a wellbore (204). Specifically, FIG. 9 shows a gamma ray (GR) log (902) plotted on a horizontal axis (904) indicating the value of each GR sample and a vertical axis (906) showing the depth of each sample. Similarly, FIG. 9 shows a neutron porosity (NPHI) log (908) plotted on a horizontal axis (910) indicating the value of each NPHI value and the same vertical axis (906) indicating the depth of each sample. Further, FIG. 9 shows depth ranges (912a, 912b, 912c, and 912d) indicating the presence of source rock as determined from the validated total organic content (vTOC) values, in accordance with one or more embodiments.

Cut-off values for GR and NPHI, determined from a comparison of the GR log (902) and NPHI log (908) are shown in FIG. 9. Specifically, a minimum cut-off value (914) for the GR log (902) and a minimum cut-off value (916) and a maximum cut-off value (918) for the NPHI log (908), are shown. For depth within the source rock windows (912a, 912b, 912c, and 912d) the value of the GR log (902) exceeds the GR cut-off value (914) and the value of the NPHI log (909) lies in the NPHI range bounded by the NPHI minimum cut-off value (916) and the NPHI maximum cut-off value (918). However, it should be noted that both these conditions, i.e., the condition of the value of the GR log (902) and the value of the NPHI log (908) must be satisfied for the GR log (902) and the NPHI log (908) taken together to be a reliable indicator of source rocks. In contrast, in depth range (920), while the GR log (902) values exceed the GR cut-off (914) the value of the NPHI log (908) does not lie within the range bounded by the minimum cut-off value (916) and the maximum cut-off value (918), and the depth range (920) does not contain source rock. Similarly, in depth range (922), while the value of the NPHI log (908) does lie within the range bounded by the minimum cut-off value (916) and the maximum cut-off value (918) the GR log (902) values do not exceed the GR cut-off (914), and the depth range (922) does not contain source rock.

In accordance with one or more embodiments, the cut-off value may be used together with the well logs (420) to determine zones of high TOC (202) in the prediction portion (208) of the segment (200) of the wellbore (204). The cut-off value may also be used to determine zones of high TOC (202) the data portion (206) particularly at locations lying between core locations. In other embodiments, the cut-off value together with recorded well logs (such as well log (420)) recorded in a second wellbore other than the wellbore (204) from which the first (210) and second plurality (212) of core samples were collected may be used to predict zones of high TOC (202). This prediction is particularly likely to be accurate if the second wellbore traverses the same source rock formation (120) as the wellbore from which the first plurality of core samples (210) and the second plurality of core samples (212) were collected.

In accordance with one or more embodiments, the combined thickness of all the zones of high TOC in the prediction portion (208) may be combined with the measured thickness of zones of high TOC in the data portion (206) to determine the net thickness of source rock.

Figure 10:
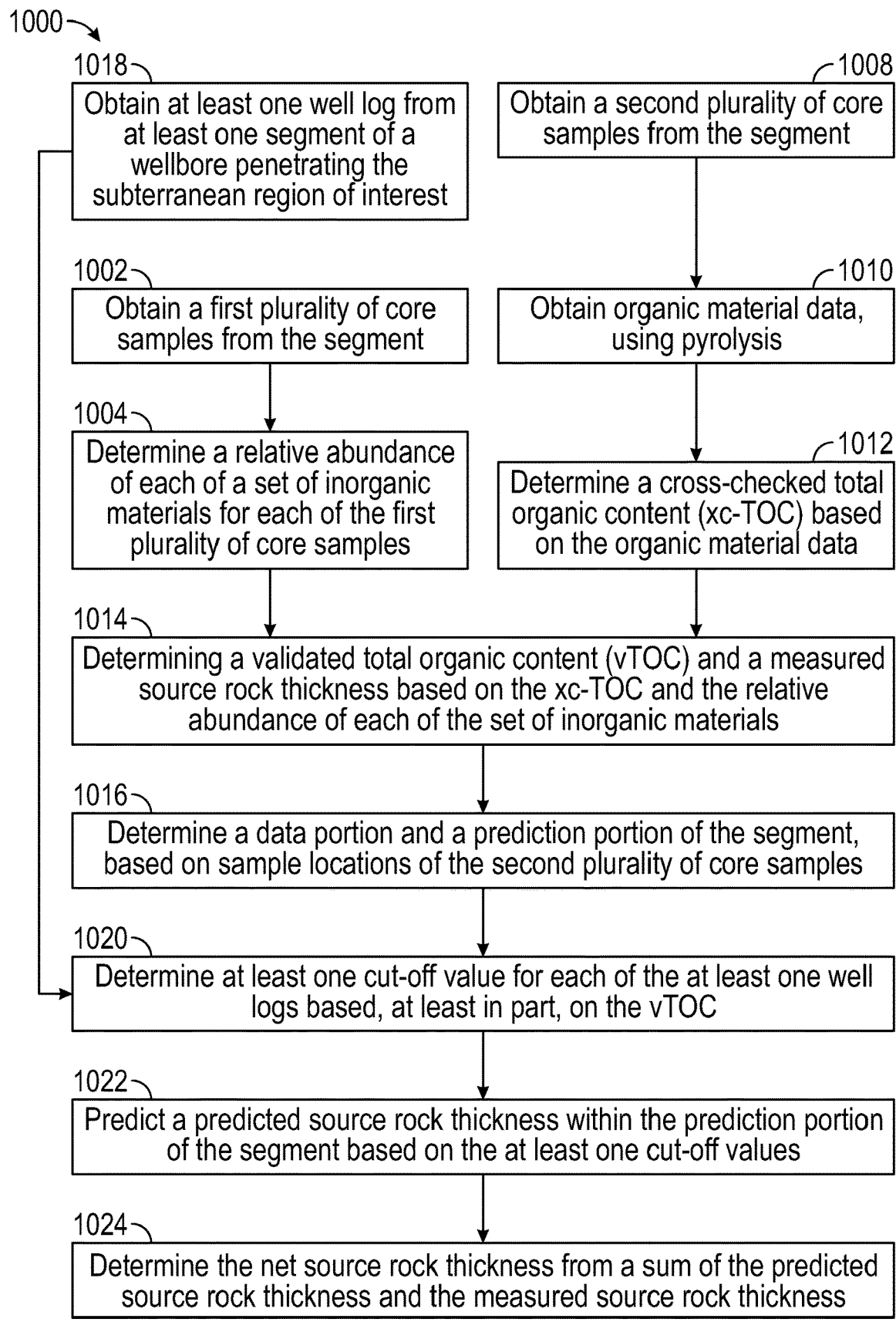
FIG. 10 shows a flowchart in accordance with one or more embodiments.

FIG. 10 shows a flowchart in accordance with one or more embodiments. In Step 1002 a first plurality of core samples may be obtained from a segment of a wellbore penetrating the subterranean region of interest. Core samples may be whole core collected while drilling the wellbore, or from sidewall cores obtained after the wellbore has been drilled.

In Step 1004 the relative abundance of each of a set of inorganic materials may be determined from for each of the first plurality of core samples. The relative abundance of each of the set of inorganic materials may be determined, at least in part by performing inductively coupled plasma-mass spectrometry (ICP-MS), X-ray fluorescence (XRF), or both. The inorganic materials may include various elements, such as, without limitation, Molybdenum (Mo), Manganese (Mn), and Titanium (Ti).

In Step 1008 a second plurality of core samples from the segment may be obtained. In some embodiments, the first plurality of core samples and the second plurality of core samples may be identical, but in other embodiments the first plurality and the second plurality may be disjoint sets. For example, the first plurality and the second plurality of core samples may be interleaved along the axis of the wellbore, such that a sample may be from the first plurality, while the sample from locations on either side of it may be from the second plurality.

In Step 1010 organic material data may be obtained from each of the second plurality of core samples using pyrolysis. Pyrolysis may involve heating a sample using a predefined heating schedule and measuring a yield of $CO_2$ emitted from the sample as a function of temperature.

In Step 1012 a cross-checked total organic content (xc-TOC) based on the organic material data may be determined. Determining the cross-checked total organic content may include comparing values of the TOC to a predetermined value.

In Step 1014 a validated total organic content (vTOC) and a measured source rock thickness may be determined based on the xc-TOC and the relative abundance of each of the set of inorganic materials. Determining the vTOC content may include interpolating the relative abundance of the inorganic materials from locations of the first plurality of core samples to locations of the second plurality of core samples. Further, determining the vTOC may include arranging each of S1, S2, S3, and Tmax as a data vector based on the sample locations of the second plurality of core samples and forming a matrix, wherein each column of the matrix comprises a data vector.

In Step 1016 a data portion and a prediction portion of the segment may be determined, based on sample locations of the second plurality of core samples. Specifically, the data portion may contain a plurality of cores, forming a dense sampling in depth of the formation traversed by the wellbore. Conversely, the prediction portion may have few or no core samples.

In Step 1018 at least one well log from at least one segment of the wellbore penetrating the subterranean region of interest may be obtained. The at least one well log may be, for example, a sonic log, a deep resistivity log, a density log, a neutron porosity log, a spectral gamma ray log, a uranium log, a thorium log, a potassium log, or a gamma ray log. Although these specific well log types are provided by way illustration, they should not be used to restrict the scope of the invention in any way. Each well log may include a measurement of a physical property of the formation a densely spaced plurality of axial locations along the wellbore.

In Step 1020 at least one cut-off value for each of the at least one well log may be determined based, at least in part, on the vTOC determined in Step (914). Determining at least one cut-off value for each of the at least one well log may include interpolating the vTOC to the plurality of measurement locations of the at least one well log.

In Step 1022 a predicted source rock thickness may be determined within the prediction portion of the segment based on the cut-off value of the at least one well log. In embodiments using only a single well log, portions of the wellbore with a value of the well log greater than the cut-off value may be designated as penetrating source rock, while portions of the wellbore with the value of the well log smaller than the cut-off may not be designated as penetrating source rock. The predicted source rock thickness may then be determined by summing the thicknesses of all the designated source rock portions.

In Step 1024 the net source rock thickness may be determined from a sum of the predicted source rock thickness in the prediction portion of the segment and the measured source rock thickness in the data portion. Furthermore, in some embodiments, the prediction method may be applied to additional wellbores, penetrating the same subterranean region, in which one or more well logs have been recorded but no core samples have been taken. In these additional wellbores a net source rock thickness may be predicted based on the one or more well logs and the cut-off values determined in Step 1020 for each well log.

Figure 13:
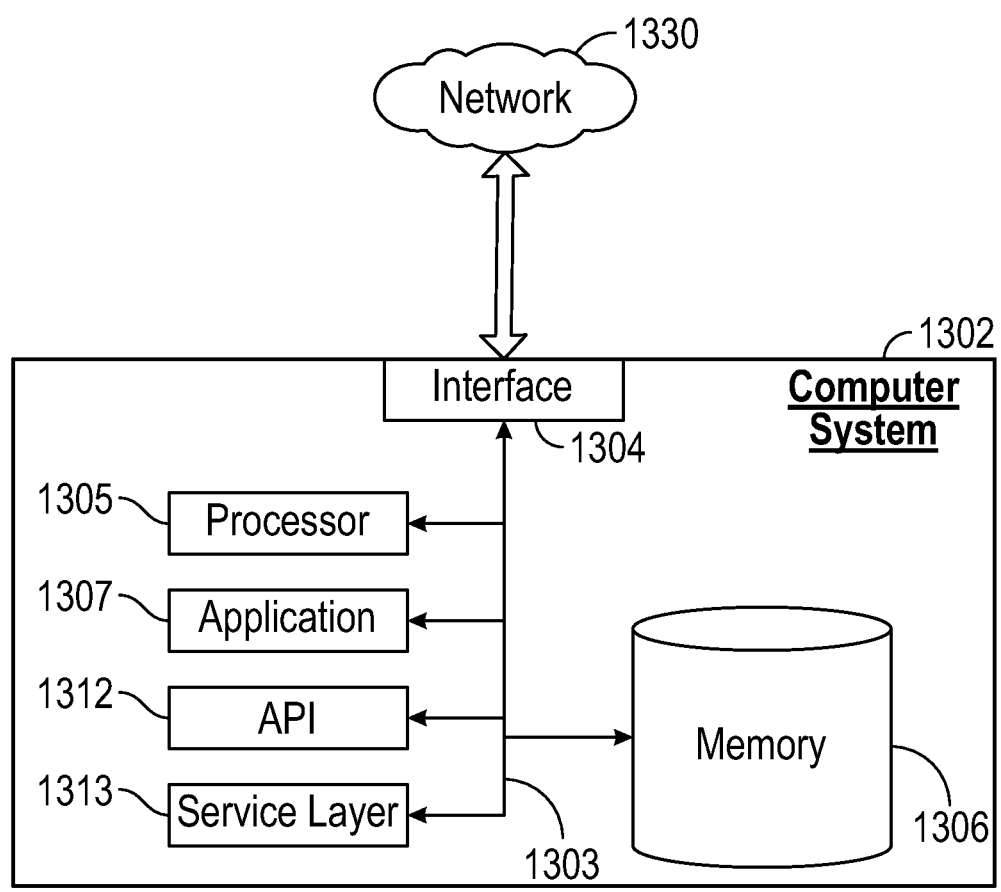
FIG. 13 shows a computer system in accordance with one or more embodiments.

A petroleum systems modeler may consist of a computer system, such as the computer illustrated in FIG. 13, together with the appropriate hardware. The purpose of the petroleum systems modeler may be to simulate the history of the reservoir formation (108) together with geological formations surrounding the reservoir formation (108), including the source rock (120), or source rocks (if there is more than one source rock formation), the seal (106) and overburden (102) through geological time from their deposition tens of millions to hundreds of millions of years ago until the present day. One purpose of performing petroleum systems modeling to predict the presence or absence of hydrocarbon, in what quantity and what type, e.g., dry gas, wet gas, and oil. Simulating the history may include simulating episodes of subsidence, uplift and rifting of the sedimentary basin containing the reservoir formation (108) caused by tectonic and other factors, and the timing and origin of deposition of kerogen rich sediments that might form source rocks (120). Further, petroleum systems modeling may predict the extent and timing of source rock (120) burial and heating relative to the deposition of overlying seals (106).

Figure 11:
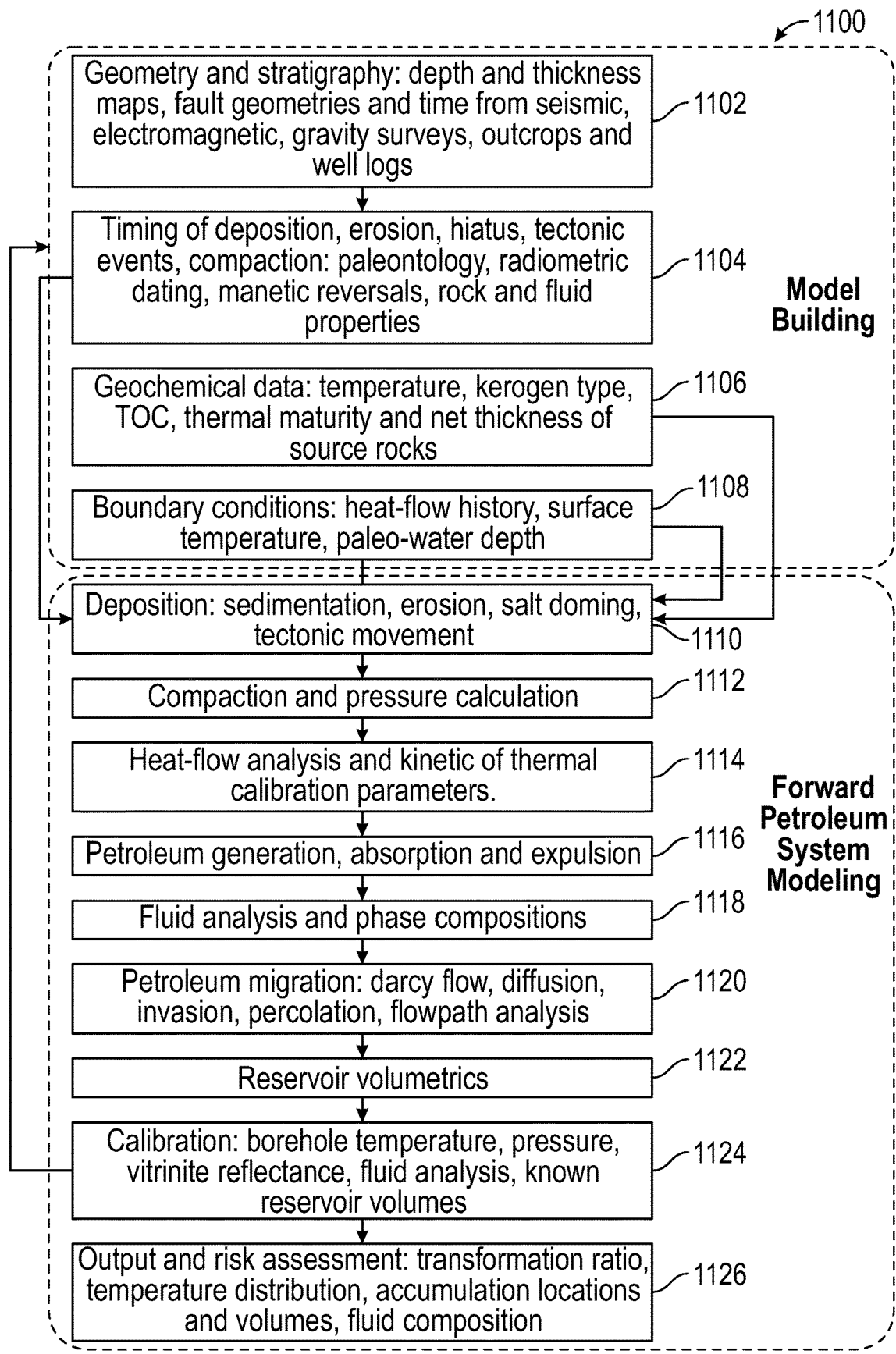
FIG. 11 shows a flowchart in accordance with one or more embodiments.

Basin and petroleum system modeling, as shown in FIG. 11, may be an iterative process with many interrelated steps. A petroleum system modeler may assemble these steps, drawn from a plurality of disciplines, into a single workflow (1100).

In accordance with one or more embodiments, in Step 1102 a depth-based structural model of the subterranean region of interest may be developed. The region of interest may encompass a single petroleum system in a small basin or multiple petroleum systems in one basin or many basins across a region. Input may typically be in the form of formation tops (the depths of the upper surface of key geological layers) and layer thicknesses and may be imported from a separate model-building program. Data sources may include seismic surveys, well logs, outcrop studies, remote-sensing data, electromagnetic soundings and gravity surveys. This model of present-day architecture of the region represents the final result of all the geological processes acting on the basin throughout its geologic history.

The geometric model may then be analyzed in Step 1104 to describe the deposition chronology and physical properties of the basin fill materials at the time of deposition and to identify post depositional processes to enable the reconstruction of the basin, its layers and fluids throughout geologic time. This analysis establishes a provisional basin history that is subdivided into a sequence of stratigraphic events of specified age and duration. Each event represents a span of time during which deposition, nondeposition or erosion occurred. The chronology of the geologic events may include syn-depositional and post-depositional episodes of folding, faulting, salt tectonics, igneous intrusion, diagenetic alteration and hydrothermal activity as required to explain the model.

Determining the timing of trap formation and of the processes of generation, migration and accumulation of hydrocarbons may be one of the most beneficial results of petroleum system modeling. The absolute age of each layer in the petroleum system model is an important parameter for determining the timing of the processes that generate, move and trap petroleum. Age information may be available from paleontologic (fossil) data, radiometric dating, fission-track dates and magnetic-reversal tracking. In many basins, known source rocks have been assigned to global geologic periods based on geochemical and biostratigraphic determinations.

In Step 1106 characterizing the source-rock depositional environment helps predict the probable petroleum product generated through kerogen maturation. Fine-grained sediments deposited in deep marine basins, on continental shelves and in anoxic lakes all contain different types of kerogen, leading to different petroleum outputs.

Source rock properties are needed as inputs to simulate the reactions that govern the degradation of organic material to produce hydrocarbons. These essential properties are the total organic carbon (TOC) measured by combustion of rock samples and the hydrogen index (HI) obtained through pyrolysis of rock samples for petroleum generation potential. Also required are kinetic parameters for the thermal conversion of the source rock kerogen to petroleum and the net thickness of the source rocks.

In Step 1108 the thermal history of a region of interest is linked to the history of the crust beneath the region. Crustal behavior determines basin subsidence, uplift and heat flow.

Modeling the petroleum potential of a region of interest requires reconstruction of the temperature over geologic time and across the region. Therefore, in addition to model properties, some specific past conditions must be evaluated. These conditions treated as boundary conditions by the petroleum systems modeling software, include water depth ("paleobathymetry"), which determines the location and type of deposition. Other boundary conditions are sediment/water interface temperatures throughout geologic time which along with paleo-heat-flow estimates, are required to calculate the temperature history of the basin.

Once boundary conditions and ages and properties of all layers have been defined, the petroleum system simulation can be run forward, starting with sedimentation of the oldest layer and progressing to the present.

In Step 1110, the creation of geological layers on the upper surface during sedimentation or their removal during erosion may be simulated. Depositional thickness, which may have been greater than current thickness, can be calculated by several methods: porosity-controlled back-stripping starting with present-day thickness, importation from structural-restoration programs, and estimation from sedimentation rate and depositional environment.

In accordance with one or more embodiments, in Step 1112 the compaction of sediments and the resulting pore pressures may be simulated. Pore pressure calculation treats dewatering as a one phase flow problem driven by changes in overburden weight caused by sedimentation. In addition, internal pressure-building processes such as gas generation, quartz cementation and mineral conversions can be taken into account. Compaction causes changes in many rock properties, including porosity, and to a lesser extent, density, elastic moduli, conductivity and heat capacity. Therefore, pressure and compaction calculations must be performed before heat-flow analysis in each time step.

In Step 1114 heat-flow analysis may be performed and temperature calculation may be a prerequisite or determining geochemical reaction rates. Heat conduction and convection from below as well as heat generated by naturally occurring radioactive minerals must be included. This often requires defining temperature boundary condition based on knowledge or assumptions about the heat profile of the crust beneath the region of interest.

In Step 1116, in accordance with one or more embodiments, the generation of petroleum from kerogen in source rocks, called primary cracking, and the subsequent breakdown of oil to gas in source or reservoir rocks, called secondary cracking, may be described by the decomposition kinetics of sets of parallel reactions. In addition, adsorption models describing the release of generated hydrocarbons into the free pore space of the source rock may be used In Step 1118, the generated hydrocarbons as mixtures of chemical components may be simulated. Fluid-flow models deal with fluid phases that are typically liquid, vapor and supercritical or undersaturated phases. The fluid-analysis step examines temperature- and pressure-dependent dissolution of hydrocarbon components in the fluid phases to determine fluid properties, such as density and viscosity, for input to fluid-flow calculations. These properties are also essential for subsequent migration modeling and calculation of reservoir volumetrics. Fluids may be modeled using a black-oil model, which has two components or phases, or as a multicomponent model.

In Step 1120 the migration of post-generated hydrocarbons from source rock to trap may be modeled. "Darcy flow" describing multicomponent three-phase flow based on relative-permeability and capillary pressure may be simulated. With this method, migration velocities and accumulation saturations are calculated in one step. Describing fluid migration across faults requires special consideration as the faults may act as a flow barrier or as a high permeability channel depending on the lithology and deformation history.

In Step 1122, the reservoir volumetics may be determined. The height of a petroleum accumulation is limited by the capillary entry pressure of the overlying seal and the (the pressure at which the seal will fail) and the spill point at the base of the structure. Loss at the spill point and leakage through the seal reduce the trapped volume and other processes, such as secondary cracking or biodegradation, can also impact the quality and quantity of accumulated petroleum. Both the seal integrity and the reservoir geometry may have changed over geological time complicating the volumetric calculation.

In Step 1124, values predicted by the petroleum system modeling may be compared against measured quantities. For example, measure current values of wellbore temperature profiles, pore pressure, fluid composition, known reservoir geometry may be compared against predicted values. Similarly, vitrinite reflectance values and concentration ratios of molecular scale fossils (biomarkers) may be predicted and compared against observations.

When these comparisons fail to give an acceptable match, the flowchart (11000 may return to the model building phase to update parameters and assumptions inherent in Steps (1102), (1104), (1106), and (1108). However, if an acceptable match is achieved the workflow may move on to Step (1126) where the matching petroleum system model may be used to assess risk (by performing multiple simulation runs with perturbed model parameters). The resulting simulations may give rather a range of possible outcomes with estimates of uncertainty rather than a single matching estimate. These uncertainty estimates may be used to determine which potential drilling targets may have an acceptable probability of delivering economic production rates of hydrocarbons and which do not.

Hence the improved estimate of net thickness of source rock, integrated into petroleum system modeling, contributes to an improved estimate of drilling success probability and consequently to deciding which potential drilling targets are actually drilled.

Figure 12:
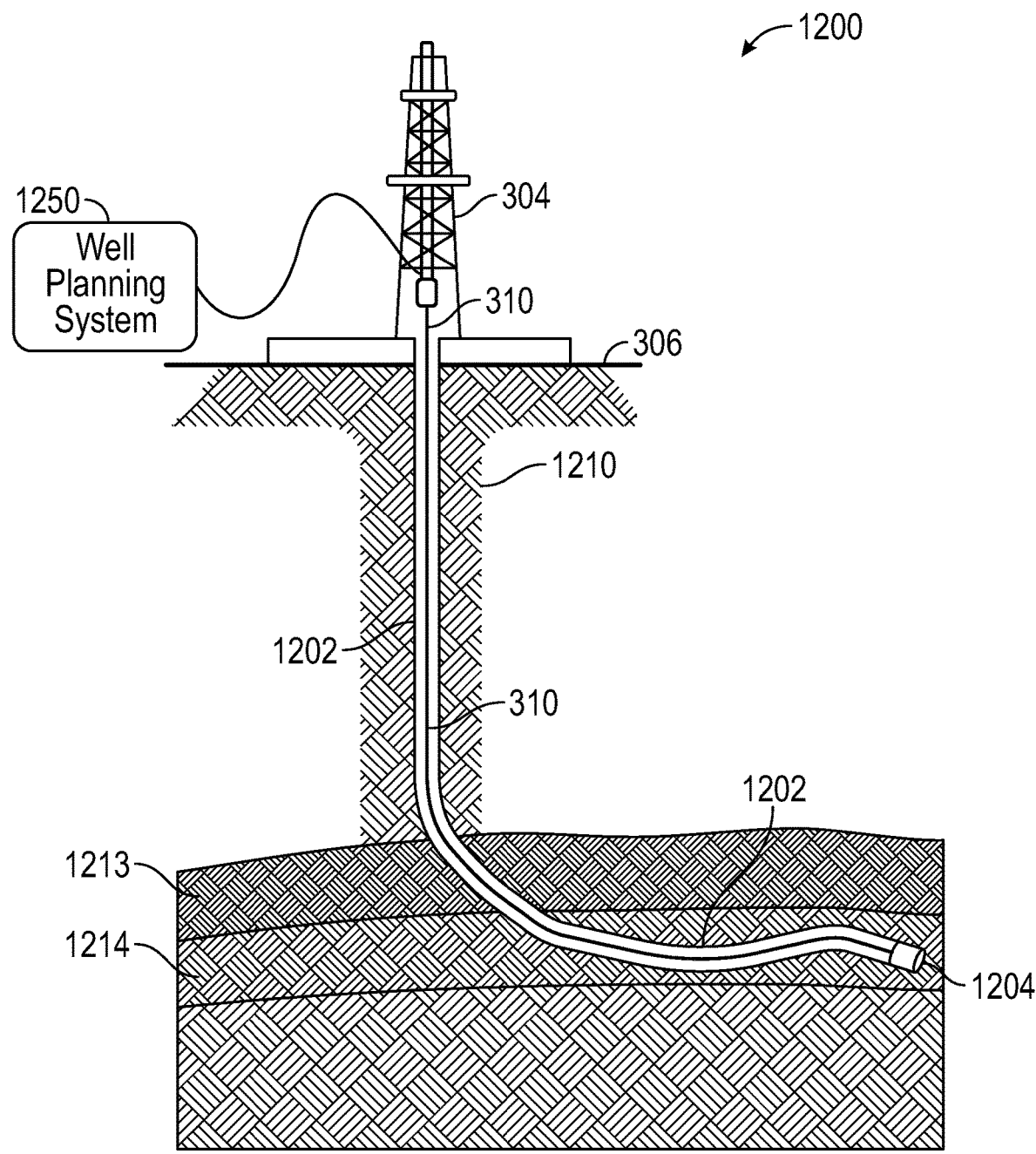
FIG. 12 shows a drilling system in accordance with one or more embodiments.

FIG. 12 shows a wellbore drilling system (1200) in accordance with one or more embodiments. As shown in FIG. 12, a wellbore path (1202) may be drilled by a drill bit (1204) attached by a drillstring (310) to a drill rig (304) located on the surface (306) of the earth. The wellbore may traverse a plurality of overburden layers (1210) and one or more cap-rock layers (1212) to a hydrocarbon reservoir (124). In accordance with one or more embodiments, a drilling target within the hydrocarbon reservoir (124) may be determined in part by the net source rock thickness. The drilling target may be accessed by a wellbore drilled in accordance with a wellbore path (1202). The wellbore path (1202) may be a curved wellbore path, or a straight wellbore path. All or part of the wellbore path (1202) may be vertical, and some wellbore paths may be deviated or have horizontal sections.

Prior to the commencement of drilling, a wellbore plan may be generated. The wellbore plan may include a starting surface location of the wellbore, or a subsurface location within an existing wellbore, from which the wellbore may be drilled. Further, the wellbore plan may include a terminal location that may intersect with the targeted hydrocarbon bearing formation and a planned wellbore path (1202) from the starting location to the terminal location. In other words, the wellbore path (1202) may intersect a previously located hydrocarbon reservoir (114).

Typically, the wellbore plan is generated based on best available information from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. Furthermore, the wellbore plan may consider other engineering constraints such as the maximum wellbore curvature ("dog-log") that the drillstring (310) may tolerate and the maximum torque and drag values that the wellbore drilling system (1200) may tolerate.

A wellbore planning system (1250) may be used to generate the wellbore plan. The wellbore planning system (1250) may comprise one or more computer processors in communication with computer memory containing the geophysical and geomechanical models, information relating to drilling hazards, and the constraints imposed by the limitations of the drillstring (310) and the wellbore drilling system (1200). The wellbore planning system (1250) may further include dedicated software to determine the planned wellbore path (1202) and associated drilling parameters, such as the planned wellbore diameter, the location of planned changes of the wellbore diameter, the planned depths at which casing will be inserted to support the wellbore and to prevent formation fluids entering the wellbore, and the drilling mud weights (densities) and types that may be used during drilling the wellbore.

A wellbore may be drilled using a drill rig (304) that may be situated on a land drill site, an offshore platform, such as a jack-up rig, a semi-submersible, or a drill ship. The drill rig (304) may be equipped with a hoisting system, which can raise or lower the drillstring (310) and other tools required to drill the well. The drillstring (310) may include one or more drill pipes connected to form conduit and a bottom hole assembly (BHA) disposed at the distal end of the drillstring (310). The BHA may include a drill bit (1204) to cut into subsurface rock. The BHA may further include measurement tools, such as a measurement-while-drilling (MWD) tool and logging-while-drilling (LWD) tool. MWD tools may include sensors and hardware to measure downhole drilling parameters, such as the azimuth and inclination of the drill bit, the weight-on-bit, and the torque. The LWD measurements may include sensors, such as resistivity, gamma ray, and neutron density sensors, to characterize the rock formation surrounding the wellbore. Both MWD and LWD measurements may be transmitted to the surface (306) using any suitable telemetry system, such as mud-pulse or wired-drill pipe, known in the art.

To start drilling, or "spudding in" the well, the hoisting system lowers the drillstring (310) suspended from the drill rig (304) towards the planned surface location of the wellbore. An engine, such as a diesel engine, may be used to rotate the drillstring (310). The weight of the drillstring (310) combined with the rotational motion enables the drill bit to bore the wellbore.

The near-surface is typically made up of loose or soft sediment or rock, so large diameter casing, e.g. "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface (306) of the earth.

Drilling may continue without any casing once deeper more compact rock is reached. While drilling, drilling mud may be injected from the surface (306) through the drill pipe. Drilling mud serves various purposes, including pressure equalization, removal of rock cuttings, or drill bit cooling and lubrication. At planned depth intervals, drilling may be paused and the drillstring (310) withdrawn from the wellbore. Sections of casing may be connected and inserted and cemented into the wellbore. Casing string may be cemented in place by pumping cement and mud, separated by a "cementing plug," from the surface (306) through the drill pipe. The cementing plug and drilling mud force the cement through the drill pipe and into the annular space between the casing and the wellbore wall. Once the cement cures drilling may recommence. The drilling process is often performed in several stages. Therefore, the drilling and casing cycle may be repeated more than once, depending on the depth of the wellbore and the pressure on the wellbore walls from surrounding rock. Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

A wellbore drilling system (1200) may be disposed at and communicate with other systems in the well environment. The wellbore drilling system (1200) may control at least a portion of a drilling operation by providing controls to various components of the drilling operation. In one or more embodiments, the system may receive data from one or more sensors arranged to measure controllable parameters of the drilling operation. As a non-limiting example, sensors may be arranged to measure WOB (weight on bit), RPM (drill rotational speed), GPM (flow rate of the mud pumps), and ROP (rate of penetration of the drilling operation). Each sensor may be positioned or configured to measure a desired physical stimulus. Drilling may be considered complete when a target zone is reached, or the presence of hydrocarbons is established.

FIG. 13 shows a system in accordance with one or more embodiments. The computer system (1302) is used to provide computational functionalities associated with described algorithms, methods, functions, processes, flows, and procedures as described in the present disclosure, according to one or more embodiments. The illustrated computer (1302) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1302) may include a computer that includes an input device, such as a keypad, keyboard, touch screen, or other device that can accept user information, and an output device that conveys information associated with the operation of the computer (1302), including digital data, visual, or audio information (or a combination of information), or a graphical user interface (GUI).

The computer (1302) can serve in a role as a client, network component, a server, a database or other persistency, or any other component (or a combination of roles) of a computer system for performing the subject matter described in the instant disclosure. The illustrated computer (1302) is communicably coupled with a network (1330). For example, a generic computer (1302), seismic processing system (1306), and seismic interpretation workstation (1308) may be communicably coupled using a network (1330). In some implementations, one or more components of the computer (1302) may be configured to operate within environments, including cloud-computing-based, local, global, or other environment (or a combination of environments).

At a high level, the computer (1302) is an electronic computing device operable to receive, transmit, process, store, or manage data and information associated with the described subject matter. According to some implementations, the computer (1302) may also include or be communicably coupled with an application server, e-mail server, web server, caching server, streaming data server, business intelligence (BI) server, or other server (or a combination of servers).

The computer (1302) can receive requests over network (1330) from a client application, for example, executing on another computer (1302) and responding to the received requests by processing the said requests in an appropriate software application. For example, since seismic processing and seismic interpretation may not be sequential, each computer (1302) system may receive requests over a network (1330) from any other computer (1302) and respond to the received requests appropriately. In addition, requests may also be sent to the computer (1302) from internal users (for example, from a command console or by other appropriate access method), external or third-parties, other automated applications, as well as any other appropriate entities, individuals, systems, or computers.

The computer (1302) includes an interface (1304). Although illustrated as a single interface (1304) in FIG. 13, two or more interfaces (1304) may be used according to particular needs, desires, or particular implementations of the computer (1302). The interface (1304) is used by the computer (1302) for communicating with other systems in a distributed environment that are connected to the network (1330). Generally, the interface (1304) includes logic encoded in software or hardware (or a combination of software and hardware) and operable to communicate with the network (1330). More specifically, the interface (1304) may include software supporting one or more communication protocols associated with communications such that the network (1330) or interface's hardware is operable to communicate physical signals within and outside of the illustrated computer (1302).

The computer (1302) also includes at least one computer processor (1305). Although illustrated as a single computer processor (1305) in FIG. 13, two or more processors may be used according to particular needs, desires, or particular implementations of the computer (1302). Generally, the computer processor (1305) executes instructions and manipulates data to perform the operations of the computer (1302) and any algorithms, methods, functions, processes, flows, and procedures as described in the instant disclosure.

The computer (1302) further includes a memory (1306) that holds data for the computer (1302) or other components (or a combination of both) that can be connected to the network (1330). For example, memory (1306) can be a database storing data consistent with this disclosure. Although illustrated as a single memory (1306) in FIG. 13, two or more memories may be used according to particular needs, desires, or particular implementations of the computer (1302) and the described functionality. While memory (1306) is illustrated as an integral component of the computer (1302), in alternative implementations, memory (1306) can be external to the computer (1302).

The application (1307) is an algorithmic software engine providing functionality according to particular needs, desires, or particular implementations of the computer (1302), particularly with respect to functionality described in this disclosure. For example, application (1307) can serve as one or more components, modules, applications, etc. Further, although illustrated as a single application (1307), the application (1307) may be implemented as multiple applications (1307) on the computer (1302). In addition, although illustrated as integral to the computer (1302), in alternative implementations, the application (1307) can be external to the computer (1302).

Each of the components of the computer (1302) can communicate using a system bus (1303). In some implementations, any or all of the components of the computer (1302), both hardware or software (or a combination of hardware and software), may interface with each other or the interface (1304) (or a combination of both) over the system bus (1303) using an application programming interface (API) (1312) or a service layer (1313) or a combination of the API (1312) and service layer (1313). The API (1312) may include specifications for routines, data structures, and object classes. The API (1312) may be either computer-language independent or dependent and refer to a complete interface, a single function, or even a set of APIs.

The service layer (1313) provides software services to the computer (1302) or other components (whether illustrated or not) that are communicably coupled to the computer (1302). The functionality of the computer (1302) may be accessible for all service consumers using this service layer. Software services, such as those provided by the service layer (1313), provide reusable, defined business functionalities through a defined interface. For example, the interface may be software written in JAVA, C++, or other suitable language providing data in extensible markup language (XML) format or another suitable format. While illustrated as an integrated component of the computer (1302), alternative implementations may illustrate the API (1312) or the service layer (1313) as stand-alone components in relation to other components of the computer (1302) or other components (whether or not illustrated) that are communicably coupled to the computer (1302). Moreover, any or all parts of the API (1312) or the service layer (1313) may be implemented as child or sub-modules of another software module, enterprise application, or hardware module without departing from the scope of this disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed:

1. A method, comprising:
    obtaining at least one well log from a segment of a wellbore penetrating a subterranean region of interest;
    obtaining a first plurality of core samples from the segment;

obtaining a second plurality of core samples from the segment;

for each core sample of the first plurality of core samples, determining a relative abundance of each of a set of inorganic materials, forming inorganic data;

for each given core sample of the second plurality of core samples:
  determining, using pyrolysis, a first yield (S1), a second yield (S2), and a third yield (S3),
  determining, a hydrogen index (HI), an oxygen index (OI), a production index (PI), a normalized S1 (Norm_S1), and a total organic content (TOC) value based on the S1, S2, and S3,
  comparing the HI, OI, PI, and Norm S1 to a corresponding organic material data cut-off condition, and
  discarding the given core sample in response to any of the HI, OI, PI, and Norm S1 not satisfying a corresponding organic material data cut-off condition;

determining a cross-checked total organic content (xc-TOC) matrix comprising the TOC value of each core sample of the second plurality of core samples that was not discarded;

identifying, based on the inorganic data, at least one sensitive element from the set of inorganic materials that correlates with the xc-TOC, wherein each of the at least one sensitive elements has either a corresponding high or low value that correlates to a high TOC value;

discarding, from the xc-TOC matrix, TOC values that, for each of the at least one sensitive elements, do not have a corresponding high or low sensitive element forming a validated total organic content (vTOC) matrix;

determining a data portion and a prediction portion of the segment, based on sample locations of the second plurality of core samples, wherein the data portion and the prediction portion are mutually exclusive and the prediction portion excludes the sample locations of the second plurality of core samples;

determining, in the data portion, depth ranges corresponding to source rock locations based on the TOC values of the vTOC;

determining a measured source rock thickness based on the depth ranges;

determining at least one cut-off value for each of the at least one well log based, at least in part, on the vTOC;

determining, in the prediction portion, zones of high TOC based on the at least one cut-off value for each of the at least one well log;

predicting a predicted source rock thickness by combining a thickness of each of the zones of high TOC;

determining a net source rock thickness of the segment from a sum of the predicted source rock thickness and the measured source rock thickness;

identifying a drilling target in the subterranean region of interest spanned by the segment based, at least in part, on the net source rock thickness; and drilling another wellbore or another segment of the wellbore, using a drilling system, to intersect the drilling target.

2. The method of claim 1, wherein the first plurality of core samples comprises the second plurality of core samples.

3. The method of claim 1, wherein:
  each core sample of the first plurality of core samples has an associated depth at which the core sample was removed from the wellbore;
  each core sample of the second plurality of core samples has an associated depth at which the core sample was removed from the wellbore;
  the inorganic data comprises the associated depth for each core sample of the first plurality of core samples; and
  the method further comprises interpolating the inorganic data to the associated depths of the second plurality of core samples.

4. The method of claim 1, further comprising forming an organic data matrix comprising a data vector comprising S1, S2, and S3 for each of the second plurality of core samples.

5. The method of claim 1, wherein determining the relative abundance of each of the set of inorganic materials comprises performing inductively coupled plasma-mass spectrometry (ICP-MS) or X-ray fluorescence (XRF).

6. The method of claim 1, wherein determining at least one cut-off value for each of the at least one well log comprises interpolating the vTOC to a plurality of sample locations of the at least one well log.

7. The method of claim 1, wherein the at least one well log comprises a sonic log, a deep resistivity log, a density log, a neutron porosity log, a spectral gamma ray log, a uranium log, a thorium log, a potassium log, or a gamma ray log.

8. A system, comprising:
  a well logging system to obtain at least one well log from at least one a segment of a wellbore penetrating a subterranean region of interest;
  a well coring system to obtain a first plurality and a second plurality of core samples from the segment;
  an inductively coupled plasma-mass spectrometry and an X-ray fluorescence system to determine, for each of the first plurality of core samples, a relative abundance for a set of inorganic materials forming inorganic data;
  a pyrolysis system to determine, for each of the second plurality of core samples, a first yield (S1), a second yield (S2), and a third yield (S3);
  a computer processor, configured to:
    for each given core sample of the second plurality of core samples:
      determine, a hydrogen index (HI), an oxygen index (OI), a production index (PI), a normalized S1 (Norm_S1), and a total organic content (TOC) value based on the S1, S2, and S3;
      compare the HI, OI, PI, and Norm S1 to a corresponding organic material data cut-off condition; and
      discard the given core sample in response to any of the HI, OI, PI, and Norm S1 not satisfying a corresponding organic material data cut-off condition,
    determine a cross-checked total organic content (xc-TOC) matrix comprising the TOC value of each core sample of the second plurality of core samples that was not discarded,
    identify, based on the inorganic data, at least one sensitive element from the set of inorganic materials that correlates with the xc-TOC, wherein each of the at least one sensitive elements has either a corresponding high or low value that correlates to a high TOC value,
    discard, from the xc-TOC matrix, TOC values that, for each of the at least one sensitive elements, do not have a corresponding high or low sensitive element forming a validated total organic content (vTOC) matrix,
    determine a data portion and a prediction portion of the segment, based on sample locations of the second plurality of core samples, wherein the data portion and the prediction portion are mutually exclusive and the prediction portion excludes the sample locations of the second plurality of core samples, determine, in the data portion, depth ranges corresponding to source rock locations based on the TOC values of the vTOC, determine a measured source rock thickness based on the depth ranges, determine at least one cut-off value for each of the at least one well logs based, at least in part, on the vTOC, determine, in the prediction portion, zones of high TOC based on the at least one cut-off value for each of the at least one well log;

predict a predicted source rock thickness by combining a thickness of each of the zones of high TOC, determine a net source rock thickness of the segment from a sum of the predicted source rock thickness and the measured source rock thickness, and identify a drilling target in the subterranean region of interest based, at least in part, on the net source rock thickness; and a drilling system configured to drill another wellbore or another segment of the wellbore to intersect the drilling target.

9. The system of claim 8, wherein the first plurality of core samples comprises the second plurality of core samples.

10. The system of claim 8, wherein:
each core sample of the first plurality of core samples has an associated depth at which the core sample was removed from the wellbore;
each core sample of the second plurality of core samples has an associated depth at which the core sample was removed from the wellbore;
the inorganic data comprises the associated depth for each core sample of the first plurality of core samples; and
the computer processor is further configured to interpolate the inorganic data to the associated depths of the second plurality of core samples.

11. The system of claim 8, wherein the computer processor is further configured to form an organic data matrix comprising a data vector comprising S1, S2, and S3 for each of the second plurality of core samples.

12. The system of claim 8, wherein determining the relative abundance of each of the set of inorganic materials comprises performing inductively coupled plasma-mass spectrometry (ICP-MS) or X-ray fluorescence (XRF).

13. The system of claim 8, wherein the at least one well log comprises a sonic log, a deep resistivity log, a density log, a neutron porosity log, a spectral gamma ray log, a uranium log, a thorium log, a potassium log, or gamma ray log.

14. The system of claim 8, wherein determining at least one cut-off value for each of the at least one well log comprises interpolating the vTOC to a plurality of sample locations of the at least one well log.

* * * * *